(12) United States Patent
Moody, II et al.

(10) Patent No.: US 8,527,561 B1
(45) Date of Patent: Sep. 3, 2013

(54) SYSTEM AND METHOD FOR IMPLEMENTING A NETWORKED FILE SYSTEM UTILIZING A MEDIA LIBRARY

(75) Inventors: William H. Moody, II, Austin, TX (US); Robert C. Sims, Round Rock, TX (US)

(73) Assignee: Crossroads Systems, Inc., Austin, TX (US)

( * ) Notice: Subject to any disclaimer, the term of this patent is extended or adjusted under 35 U.S.C. 154(b) by 82 days.

(21) Appl. No.: 13/109,192

(22) Filed: May 17, 2011

(51) Int. Cl.
  *G06F 17/30* (2006.01)
  *G06F 13/00* (2006.01)
  *H03M 13/00* (2006.01)

(52) U.S. Cl.
  USPC .......................... 707/822; 711/154; 714/781

(58) Field of Classification Search
  None
  See application file for complete search history.

(56) References Cited

U.S. PATENT DOCUMENTS

| | | | |
|---|---|---|---|
| 5,488,702 A | 1/1996 | Byers | |
| 7,266,556 B1 * | 9/2007 | Coates | 1/1 |
| 2010/0182887 A1 | 7/2010 | Moody | |
| 2012/0179867 A1 * | 7/2012 | Chakravarty et al. | 711/111 |

OTHER PUBLICATIONS

Pease, David, et al., "The Linear Tape File System," IBM Yamato Lab, 2010, 8 pgs., #978-1-4244-7153-9/10, IEEE, US.
Long Term File System Information Center 1.2.1.1, Overview, LTFS Format, IBM Corp., 2010, 1 pg.
HP Linear Tape File System (LTFS), HP OEM Newsletter, Sep. 2010, 15 pgs.
Coolen, Ilja, IBM's Long Term Filesystem, short term usage? Apr. 26, 2010, 3 pgs. at <<http://www.iljacoolen.nl/2010/04/ibms-long-term-filesystem-short-term-usage/>>.
Linear Tape File System (LTFS) Format Specification, LTFS Format Version 2.0.0., Mar. 11, 2011, 69 pgs, accessed on Sep. 29, 2011 at http://www.trustlto.com/LTFS_Format_To%20Print.pdf.
Office Action for U.S. Appl. No. 13/267,743, mailed Dec. 19, 2012, 13 pages.
Anyone Using LTFS with LTO-5? Post, Reduser.net, Sep. 29, 2010, 3 pgs. at <<http://reduser.net/forum/showthread.php?t=50309>>.
Office Action for U.S. Appl. No. 13/267,743, mailed Jun. 19, 2013, 26 pgs.

* cited by examiner

*Primary Examiner* — Tarek Chbouki
(74) *Attorney, Agent, or Firm* — Sprinkle IP Law Group

(57) ABSTRACT

Embodiments of systems and methods for implementing a file system utilizing a media library are disclosed. In particular, embodiments may present a network based file system to one or more host devices. These host devices may utilize the network based file system to organize, store, read or perform other operations in association with files. These files may be managed in conjunction with the media library.

21 Claims, 20 Drawing Sheets

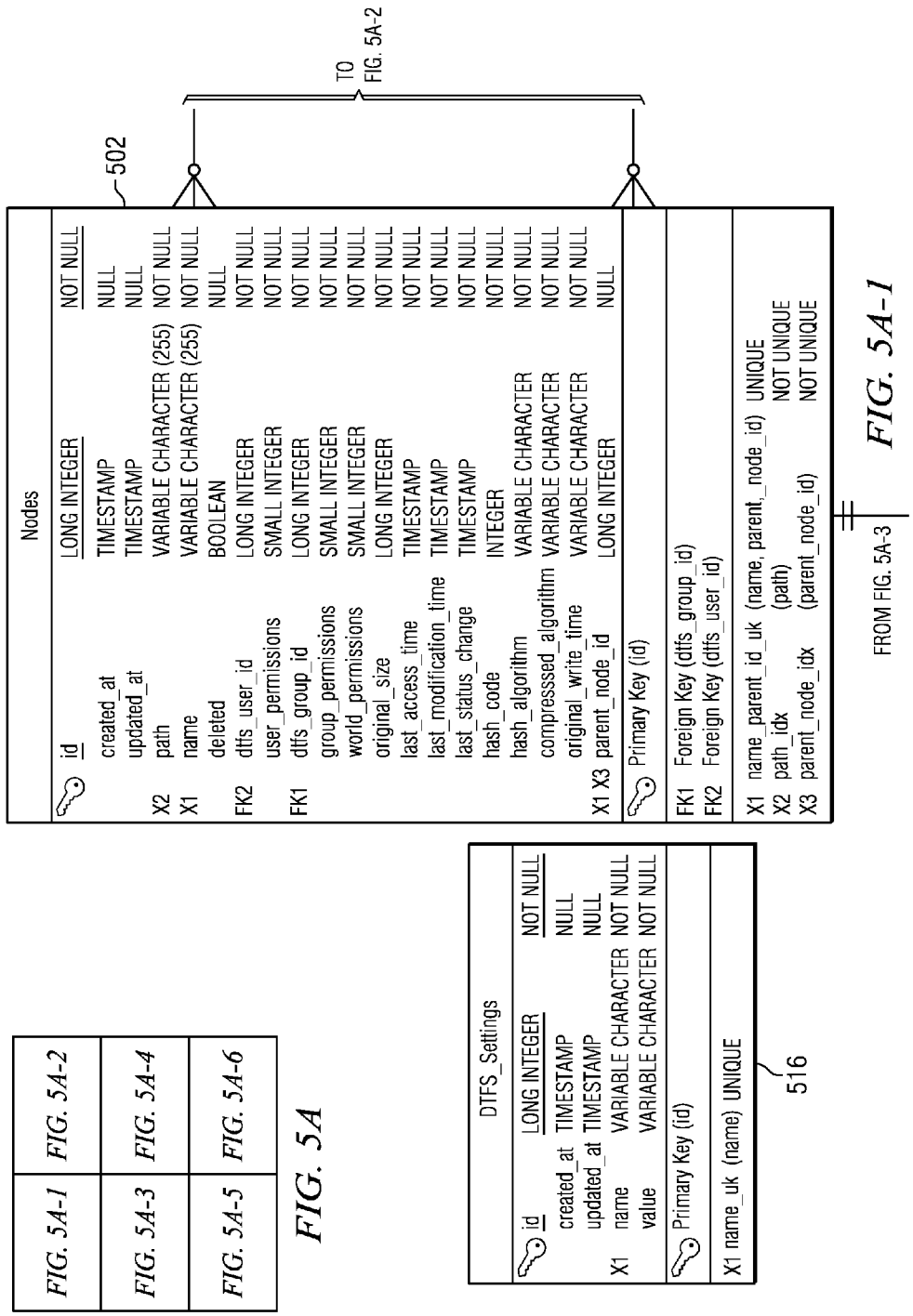

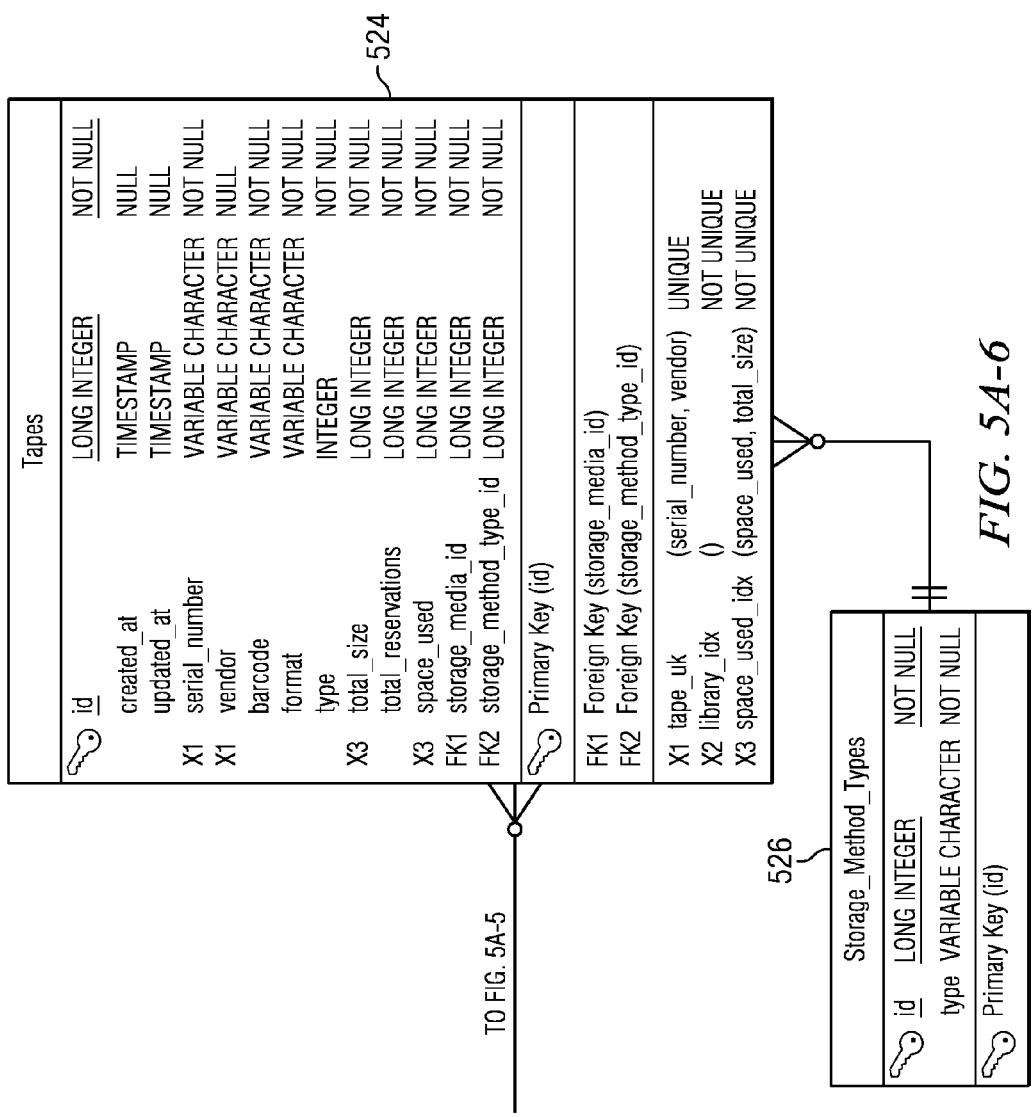

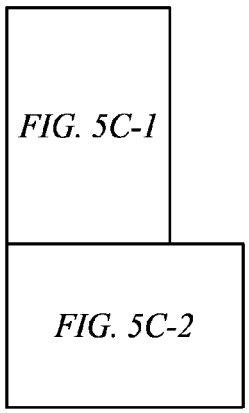

FIG. 5C

| | Nodes | | |
|---|---|---|---|
| 🔑 id | LONG INTEGER | NOT NULL | |
| created_at | TIMESTAMP | NULL | |
| updated_at | TIMESTAMP | NULL | |
| X2 path | VARIABLE CHARACTER (255) | NOT NULL | |
| X1 name | VARIABLE CHARACTER (255) | NOT NULL | |
| deleted | BOOLEAN | NULL | |
| FK2 dtfs_user_id | LONG INTEGER | NOT NULL | |
| user_permissions | SMALL INTEGER | NOT NULL | |
| FK1 dtfs_group_id | LONG INTEGER | NOT NULL | |
| group_permissions | SMALL INTEGER | NOT NULL | |
| world_permissions | SMALL INTEGER | NOT NULL | |
| original_size | LONG INTEGER | NOT NULL | |
| last_access_time | TIMESTAMP | NOT NULL | ~502 |
| last_modification_time | TIMESTAMP | NOT NULL | |
| last_status_change | TIMESTAMP | NOT NULL | |
| hash_code | INTEGER | NOT NULL | |
| hash_algorithm | VARIABLE CHARACTER | NOT NULL | |
| compressed_algorithm | VARIABLE CHARACTER | NOT NULL | |
| original_write_drive | VARIABLE CHARACTER | NOT NULL | |
| X1 X3 parent_node_id | LONG INTEGER | NULL | |
| 🔑 Primary Key (id) | | | |
| FK1 Foreign Key (dtfs_group_id) | | | |
| FK2 Foreign Key (dtfs_user_id) | | | |
| X1 name_parent_id_uk (name, parent_node_id) | UNIQUE | | |
| X2 path_idx (path) | NOT UNIQUE | | |
| X3 parent_node_idx (parent_node_id) | NOT UNIQUE | | |

FIG. 5C-1       FROM FIG. 5C-2

SYSTEM AND METHOD FOR IMPLEMENTING A NETWORKED FILE SYSTEM UTILIZING A MEDIA LIBRARY

TECHNICAL FIELD

This disclosure relates to the field of data storage. More particularly, this disclosure relates to file systems. Even more particularly, this disclosure relates embodiments of implementations of networked file systems utilizing media libraries.

BACKGROUND

Businesses, governmental organizations and other entities are increasingly saving large volumes of data necessary for daily operations. This data represents a significant asset for these entities. Consequently, data loss, whether accidental or caused by malicious activity, can be costly in terms of wasted manpower, loss of goodwill from customers, loss of time and potential legal liability. To ensure proper protection of data for business and legal purposes (e.g., to ensure quick recovery of data in the event of a disaster, to comply with document retention requirements, etc.), these entities often back up data to a physical media, such as magnetic tapes or optical disks on a regular basis.

Traditional backup systems placed an application server, backup server, source device, destination device and a local area network ("LAN") in the data path of backup operations. Under these systems, the LANs were becoming overburdened by the amount of data being copied. Often, the backup window (the period in which data unavailable for normal operations in order to permit backup) was too short to achieve a complete backup of data. Accordingly, many entities implemented Storage Area Networks ("SAN") to relieve the burden of mass data storage and backup from the LAN, freeing the LAN for more immediate data storage and manipulation operations. In SANs data from multiple machines on a network may be backed up to a remote media library. Centralized data backup allows storage problems to be identified at one location and has the advantage of increased efficiency.

One example of a media library commonly used in enterprise backup systems is a magnetic tape library. In a typical magnetic tape library, tapes are contained in cartridges and the tape library contains multiple cartridge slots in which tape cartridges can be stored. The tape cartridges are physically moved between cartridge slots and tape drives by a robot. The robot is controlled by access commands received from the host devices on the network. When specific data is required, the host device determines which cartridge slot contains the tape cartridge that holds the desired data. The host device then transmits a move-element command to the robot and the robot moves the tape cartridge.

In a SCSI tape library, for example, devices that are part of the library are typically addressed by target number and logical unit numbers ("LUN"). Thus, each drive and robot of a tape library typically has a target number and LUN. Cartridge slots, on the other hand, are addressed by element numbers that are used by the robot to locate the slots. Because the robot also places tape cartridges in the drives, each drive is also associated with an element number. If multiple tape libraries are connected to a single device (e.g., a fibre channel to SCSI router, etc.), the tape libraries may be further addressed by bus number.

In current tape library systems, each tape library may present itself as an independent entity on the network. Each host in these systems maintains a view (i.e., a table of target numbers, LUNs and element numbers) of each of the tape libraries. Using this address information a host can format commands to the tape library to perform read/write, backup and other operations. In order to coordinate activities, hosts must cooperate with each other in issuing these commands.

Enabling cooperation, however, requires some form of application to arbitrate between the various hosts or applications that are accessing the tape library. Thus, it may be necessary to employ some form of application (such as a backup application, like Microsoft Software Initiator) to read and write tapes in a tape library. Additionally, many of these issues may only be dealt with in software if the hosts use the same application or at least compatible applications. For example, if two hosts use the same backup application to store their data to tape, the application can coordinate the access requests of the two hosts so that both are backed up to the tape library. If, on the other hand, the two hosts use different backup applications, the applications will most likely not be able to coordinate their actions to ensure that both of the hosts are properly backed up, since they were probably independently designed and are consequently incompatible. Thus, to prevent conflicts between hosts, each host must typically use the same application to access a shared tape library. This can be inefficient as individual tape libraries cannot store data from multiple applications. Moreover, the files written on a tape by a backup application are written in a format proprietary to that backup application. Thus, to restore or otherwise access files on those tapes, the same backup application is required.

Recently, however, the Ultrium Linear Tape Open (LTO)-5, specification for tapes (hereby incorporated by reference in its entirety for all purposes) has included support for partitioning. The Linear or Long Term File System (LTFS) Format Specification by IBM and Ultrium (also hereby fully incorporated by reference in its entirety for all purposes) makes use of this partitioning support to define a tape format. The LTFS tape format defines a file system for LTO-5 tapes using an eXtensible Markup Language (XML) schema architecture and was utilized in conjunction with the IBM LTO Gen5 Drive. This file system support allows the use of an LTFS-formatted tape as if it were a file system. Files and directories may appear in a directory listing, files may be dragged and dropped from tape, data may be accessed at the file level, etc. With LTFS, tape media can be used like other storage media (e.g. flash drive, hard disk drives, etc.).

Consequently, while it previously was necessary to make use of a backup application to write and read tapes, the introduction of LTFS has simplified the storing and retrieval of files on tape by reducing such operations to a copy. Furthermore, any operating system that includes LTFS support can mount an LTFS formatted tape and read and write the files thereon.

Although LTFS makes the use of a single tape much simpler, it does, however, have limitations. As defined in the current specification the LTFS file system may be limited to a single tape. If it is desired to use multiple LTFS tapes these tapes are mounted one at a time or additional support is provided. While the capacity of an LTO-5 tape is relatively high (e.g., around 1500 GB to 3.0 TB or greater) in the realm of business data and backup applications this is a major restriction.

Another significant limitation of the LTFS specification is that it does not include support for tape libraries. The LTFS specification only defines a single tape/tape drive combination. After the tape drive is loaded with the tape the file system may be mounted after which it becomes useable. Manual intervention is required to unload one tape and load another if access to files on a different tape is desired.

It is thus desired to effectively leverage tape libraries to provide storage in conjunction with a networked based file system and, particularly, to provide a networked based file system utilizing tape libraries that employ LTFS.

SUMMARY

Embodiments of systems and methods for implementing a file system utilizing a media library are disclosed. In particular, embodiments may present a network based file system to one or more host devices. These host devices may utilize the network based file system to organize, store, read or perform other operations in association with files. These files may be managed in conjunction with the media library.

Such a media library may be, for example, a tape library or the like. In certain embodiments, LTFS may be employed in conjunction with a tape library such that the tapes in the tape library may be formatted using LTFS. Accordingly, operations with respect to the files on the tapes in the tape library may be performed using LTFS. A mapping may be maintained between the files visible through the networked based file system presented to the host devices and the corresponding location of those files on an LTFS tape in the tape library.

Embodiments of such a system may include a data store, which may be on a storage medium that is relatively faster for random accesses such as a disk. Files that are stored by the host devices using the networked based file system may initially be stored on the disk. These files are subsequently migrated to media in the media library.

Thus, embodiments may include an archive node appliance and a media library comprising a set of media, such as a tape library and a set of tapes. The archive node appliance may be configured to present an interface to a network based file system to a set of hosts, receive a request to store a file at a first location associated with the network based file system over the network based file system interface, store the file at a second location on a tape of the tape library, wherein the second location mirrors the first location, receive a request to read the file at the first location associated with the network based file system, determine the tape on which the file is stored, access the file on the tape at the second location, and respond to the request over the network based file system interface using the file on the tape.

In some embodiments, the first location was created by a user at one of the set of hosts using the network based file system interface. Other embodiments may keep a portion of each file in a read cache on the data store such that reads of the file may be responded to initially using this portion of the file in the read cache, allowing time for the file to be accessed on tape.

Embodiments may thus provide a number of advantages. One important advantage is that the file system structure presented through the network based file system may be substantially mirrored on the tapes of the tape library. Accordingly, if there is a failure the files on the tapes may be easily located as they are stored according to a structure that is substantially identical to that defined by the users at the hosts using the network based file system.

Furthermore, the use of LTFS means that tapes on which files of the network based file system are stored may be mounted and the file system on these tapes accessed, using any computing device which supports LTFS. As LTFS is commonly provided in many of today's operating systems, these tapes (and files stored thereon) may be easily accessed, allowing files to be restored or otherwise manipulated without requiring specialized software.

Embodiments may thus abstract a tape library to implement a network based file system and hide the corresponding complexity entailed by the use of such a tape library. By using a computer readable memory that is relatively faster for random accesses such as a disk in conjunction with the tape library to provide the network based file system speed customarily associated with a network based file system may be provided by masking the latency of the use of the media library.

Furthermore, the use of LTFS in conjunction with the tape library allows the file system created by users using the network based file system to be mirrored on the tape. Thus, when restoring files from the tape of the tape library in the event of a failure, no specialized structural knowledge is required. The files on the tape are in the locations where they were placed by the users in conjunction with the network based file system.

It will be noted that embodiments of the systems and methods presented herein can be implemented in standalone devices, routing devices such as routers, bridges, hubs or other types of network devices and that while embodiments have been illustrated utilizing a standalone Archive Node Appliance other embodiments may equally well apply to other contexts. Additionally, embodiments can be implemented as hardware, software programming or some combination. Embodiments can be implemented as computer instructions stored on any computer readable medium known in the art (e.g., optical disk, magnetic disk, flash memory, RAM, ROM, EEPROM or other computer readable medium).

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
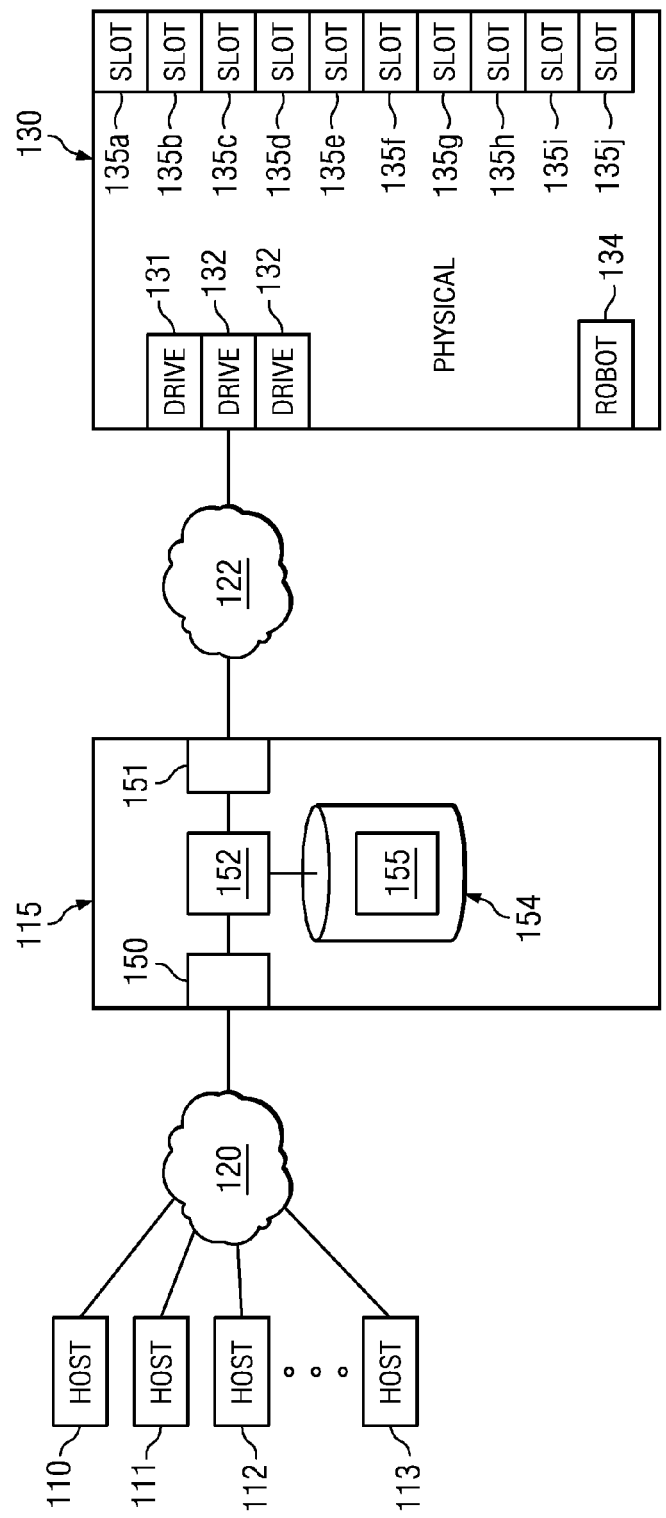
FIG. 1 is a diagrammatic representation of one embodiment of system comprising an Archive Node Appliance.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Before discussing specific embodiments, embodiments of a hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylist, etc.) or the like. In various embodiments, the computer has access to at least one database.

ROM, RAM, and HD are computer memories for storing computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of complied C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations include, but is not limited to: "for example," "for instance," "e.g.," "in one embodiment."

It will be recalled from the above discussion that in many instances it may be desired to provide a file system utilizing media libraries. To that end, attention is now directed to systems and methods for implementing a file system utilizing a tape library. In particular, embodiments may present a network based file system to one or more host devices. These host devices may utilize the network based file system to organize, store, read or perform other operations in association with files. These files may be managed in conjunction with a tape library. Specifically, commands in a network file system protocol may be received. These commands may be associated with operations to be performed on files, including operations associated with the organization, storage or retrieval of those files. Library control functionality that allows tapes in the tape library to be tracked and tapes to be moved into and out of drives and storage slots is utilized to manage the tape library such that those commands can be implemented in conjunction with the tape library.

In certain embodiments, LTFS may be employed in conjunction with the tape library such that the tapes in the tape library may be formatted using LTFS. Accordingly, operations with respect to the files on the tapes in the tape library may be performed using LTFS. A mapping may be maintained between the files visible through the networked based file system presented to the host devices and the corresponding location of those files on an LTFS tape in the tape library. Thus, when a command for an operation on a file is received from a host, the proper tape in the tape library can be located, placed in a drive and the LTFS file system on the tape mounted. The operation on the file can then be performed using LTFS. It should be noted here that while embodiments as discussed include a tape library having tapes formatted according to LTFS, other types of media libraries that utilize media of the same or different type where the media may be formatted according to the same or another type of file system may be employed in other embodiments.

To increase performance, embodiments of such a system may include a data store, which may be on a storage medium that is relatively faster for random accesses such as a disk. Files that are stored by the host devices using the networked based file system may initially be stored on the disk. These files are subsequently migrated to tapes in the tape library. Once a file has been migrated all, or a portion of, that file may be deleted from the disk. When a file is subsequently accessed it can be determined if the file is on the disk or stored on tape. The file can then be accessed from the disk, a tape or a combination of the two.

FIG. 1 is a diagrammatic representation of a system in which a media library is managed to present a network based file system to a plurality of hosts (i.e. host devices). Archive Node Appliance 115 can comprise one or more communications interfaces 150, 151 (e.g., fibre channel interface, Ethernet port or any other type of communication interface known in the art) to connect Archive Node Appliance 115 to network 120 and network 122. In this embodiment, hosts 110, 111, 112 and 113 are coupled to an Archive Node Appliance 115 via network 120. Network 120 can comprise the Internet, a LAN, a WAN, a SAN, a wireless network, or any other communications link, network or protocol known in the art. For example, network may comprise an Ethernet based network employing TCP/IP.

Archive Node Appliance 115 is coupled to media library 130 via network 122 (Archive Node Appliance 115 and media library 130 may be collectively referred to as an Archive Node or a Networked Attached Tape Archive (NATA)). Network 122 can comprise the Internet, a LAN, a WAN, a SAN, a wireless network, or any other communications link, network or protocol known in the art. For example, network 122 may comprise a fibre channel network (such as a fibre channel SAN) or a SCSI bus, such as a Serial Attached SCSI (SAS) bus. While Archive Node Appliance 115 has been depicted as a standalone device in this embodiment, it should be understood that Archive Node Appliance 115 can be implemented in a variety manners and in a variety of architectures. For example, when implemented in a SAN, the Archive Node Appliance may be part of a router, part of a media library or at any other location in a communication path between hosts and a media library.

Media library 130 may comprise a tape library or another media library known in the art such as optical jukeboxes. A tape library, as would be understood by one of ordinary skill in the art, typically consists of one or more tape drives that can read/write data from/to magnetic tape (contained within cartridges also referred to herein as tapes or tape cartridges), eject tape cartridges and perform other operations. A series of slots stores the tape cartridges when they are not in a drive and a robot moves the magnetic tape cartridges between the drives and slots.

As an example, media library 130 can comprise drives 131-133, robot 134 and slots 135 (individually slots 135a-j). It should be noted that a media library that employs a single robot or multiple robots in an expandable or modular configuration, but presents itself as a single media library to a network, or any other configuration of one or more media libraries, either physical or virtual, that can present itself as a single media library can be considered a single media library for the purposes of this application. It will also be noted that though the embodiment depicts only a single media library, other embodiments may be coupled to, and utilize, multiple media libraries.

Archive Node Appliance 115 comprises a computer processor 152 and a computer readable memory 154 (e.g. RAM, ROM, magnetic disk, optical disk and/or any other computer readable memory known in the art) that can store computer instructions 155 that are executable by processor 152. Computer instructions 155 can be implemented as hardware, software, firmware, some combination or in any other suitable manner as would be understood by those of ordinary skill in the art.

In operation, computer instructions 155 can be executable such that Archive Node Appliance 115 can present a network based file system (i.e. a file system accessible over a network) to hosts 110, 111, 112, 113, allowing these hosts to organize, store or retrieve files or perform other operations associated with a file system. Operations that can be performed using such network based files systems are understood by those of skill in the art. This network based file system may be for example, a Network File System (NFS) based file system, a Common Internet File System (CIFS) based file system, a File Transfer Protocol (FTP) based file system, a Secure Copy Protocol (SCP) based file system, a Representational State Transfer (REST) based file system, or a file system based on any another type of protocol which allows a file system to be accessed over a network.

Computer instructions 155 may thus be executable to implement operations associated with the presented network based file system in conjunction with media library 130. More specifically, in one embodiment, drives 131, 132, 133 may be LTO-5 compliant drives and tapes in media library 130 may be formatted according to LTFS (as disclosed in the Linear Tape File System Format Specification Version 2.0. by IBM, hereby incorporated by reference in its entirety). Computer instructions 155 may be executable to store files received through the networked based file system on the LTFS tapes in the media library 130 and maintain mapping information between the files visible through the network based file system and the location of those files in the media library. When a file visible through the network based file system is accessed, computer instructions 155 can be executed to determine the location of the accessed file in the media library 130 using the mapping information, locate and load the correct tape into a drive, and use LTFS to mount the LTFS file system on the tape and access the file.

To increase performance, in some embodiments, it may be desired to store files on computer readable memory 154 when they are initially received, and migrate these files to the media library 130 at a later point. Computer instructions 155 may therefore be executable to store files stored by hosts using the network based file system to the computer readable memory 154. At some later point, the computer executable instructions 155 may be executable to migrate the file from the computer readable memory 154 to the media library 130. In this case, computer executable instructions 155 are executable to maintain mapping information between the files visible through the network based file system and the location of those files on the computer readable memory 154 or the media library 130. When a file visible through the network based file system is accessed, computer instructions 155 can be executed to determine the location of the accessed file on the computer readable memory 154 or in the media library 130 using the mapping information. Depending on the location of the accessed file then, the file may be accessed on the computer readable memory 154, or the correct tape located and loaded into a drive and LTFS used to mount the file system on the tape and access the file.

The use of LTFS in conjunction with the media library 130 can afford a number of advantages when employed by an Archive Node Appliance 115 to implement a networked based file system. One important advantage is that the file system structure presented through the network based file system may be substantially mirrored on the tapes of the media library 130. Accordingly, if there is a failure of the Archive Node Appliance 115 or media library 130, the files on the tapes of the media library 130 may be easily located, as they are stored according to a structure that is substantially identical to that defined by the users at the hosts using the network based file system.

Furthermore, the use of LTFS means that tapes on which files of the network based file system are stored may be mounted and the file system on these tapes accessed, using any computing device which supports LTFS. As LTFS is commonly provided in many of today's operating systems, these tapes (and files stored thereon) may be easily accessed, allowing files to be restored or otherwise manipulated without requiring specialized software.

To put a finer point on some of the advantages offered by embodiments disclosed herein, the functionality and performance of a network based file system may be achieved while simultaneously achieving the benefits of storage on a medium typically used for backup without the need for any type of specific backup application. The use of an Archive Node Appliance may abstract the media library to implement a network based file system and hide the corresponding complexity entailed by the use of such a media library. By using a computer readable memory which is relatively faster for random accesses such as a disk in conjunction with the media library to provide the network based file system the Archive Node Appliance may provide the speed customarily associated with a network based file system by masking the latency of the use of the media library. Simultaneously, the use of such a media library provides the benefit of having files automatically stored on a storage media typically used for backup without specific action by users or the use of a backup application.

Furthermore, the use of LTFS in conjunction with the media library allows the file system created by users using the network based file system to be mirrored on the storage media. Thus, when restoring files from the storage media of the media library in the event of a failure, no specialized structural knowledge is required. The files on the storage media are in the locations where they were placed by the users in conjunction with the network based file system. Moreover, since LTFS is commonly supported data on the storage media may be easily accessed without the need for specialized software such as a backup application.

Figure 2:
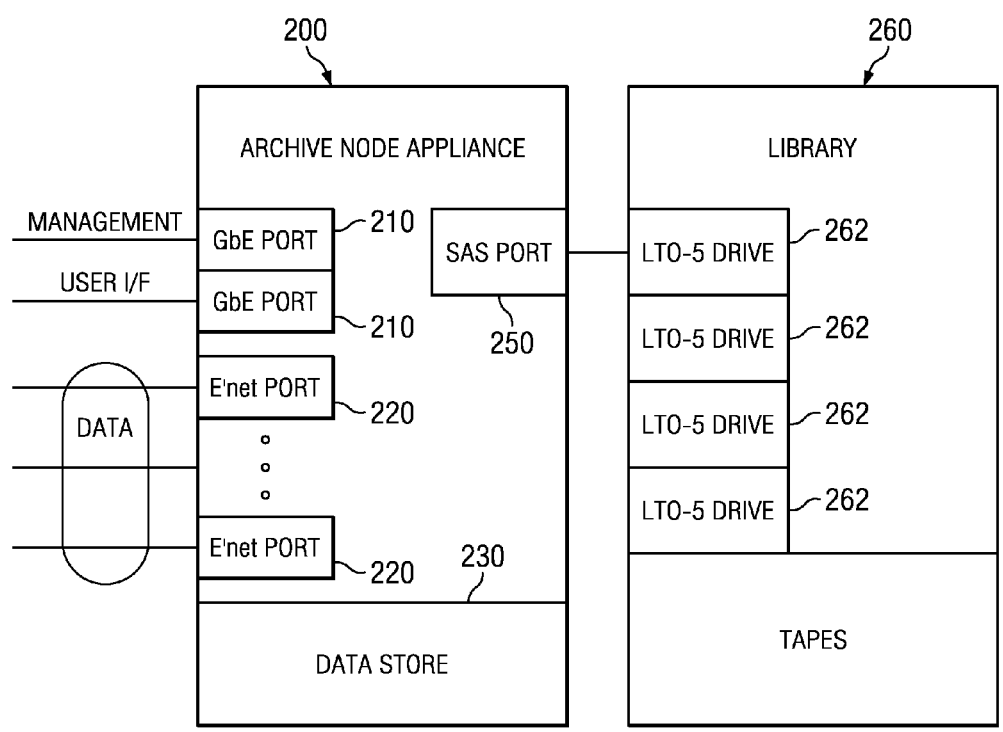
FIG. 2 is a diagrammatic representation of one embodiment of an Archive Node Appliance.

It may be helpful here to illustrate architectures for certain embodiments of an Archive Node. FIG. 2 depicts one embodiment of an architecture for an Archive Node that may be used in instances where relatively lower capacity is desired. Here, the Archive Node Appliance 200 may comprise one or more Gigabit Ethernet ports 210. These Gigabit Ethernet ports 210 may be dedicated to providing a user interface or for a systems management interface such as the Intelligent Management Platform Interface (IPMI). The Archive Node Appliance 200 may also comprise one or more Ethernet ports 220 for data connections. These Ethernet ports may be 10BASE-T, 100BASE-TX, 1000BASE-T, 10 GBASE-LR, 10 GBASE-LW, 10 GBASE-LRM, 10 GBASE-ZR, 10 GBASE-LX4, 10BASE-CX4, etc. or may be of a mixture of types. In operation these Ethernet ports 220 may be coupled to hosts, such that a network based file system may be provided by the Archive Node Appliance 200 and hosts may interface with the Archive Node Appliance 200 using these Ethernet ports 220 to utilize the network based file system, for example, by storing or retrieving files using the network based file system. The network based file system may be implemented using a file system implemented in association with user space such as the Filesystem in Userspace (FUSE) file system; using a kernel-based file system such as Ext2, Ext3, Ext4 Next3, etc.; or almost any other type of file system desired.

Archive Node Appliance 200 also includes a data store 230. Data store 230 may be a computer readable memory used to store computer executable instruction, files stored using the network based file system or other data utilized by Archive Node Appliance 200, as will be elaborated on in more detail subsequently. To ensure some degree of redundancy or fault tolerance, data store 230 may implemented as Redundant Array of Independent Disks (RAID) storage having around 5 TB-8 TB of available storage. Archive Node Appliance 200 also comprises a SAS port 250 through which the Archive Node Appliance 200 is coupled to media library 260 via a SAS bus. Media library 260 may be an IBM TS3100 tape library having one or more LTO-5 compliant drives 262 and capable of holding 24 tape cartridges or an IBM TS3200 tape library having one or more LTO-5 compliant drives 262 capable of holding 48 tape cartridges.

While it should be noted that Archive Node Appliance 200 may be implemented in substantially in any form factor desired, in one embodiment Archive Node Appliance may be based on a rack-mount storage format and may, for example, be contained chassis of a 1 U, 2 U or 3 U form factor with the data store residing internally to the chassis.

Figure 3:
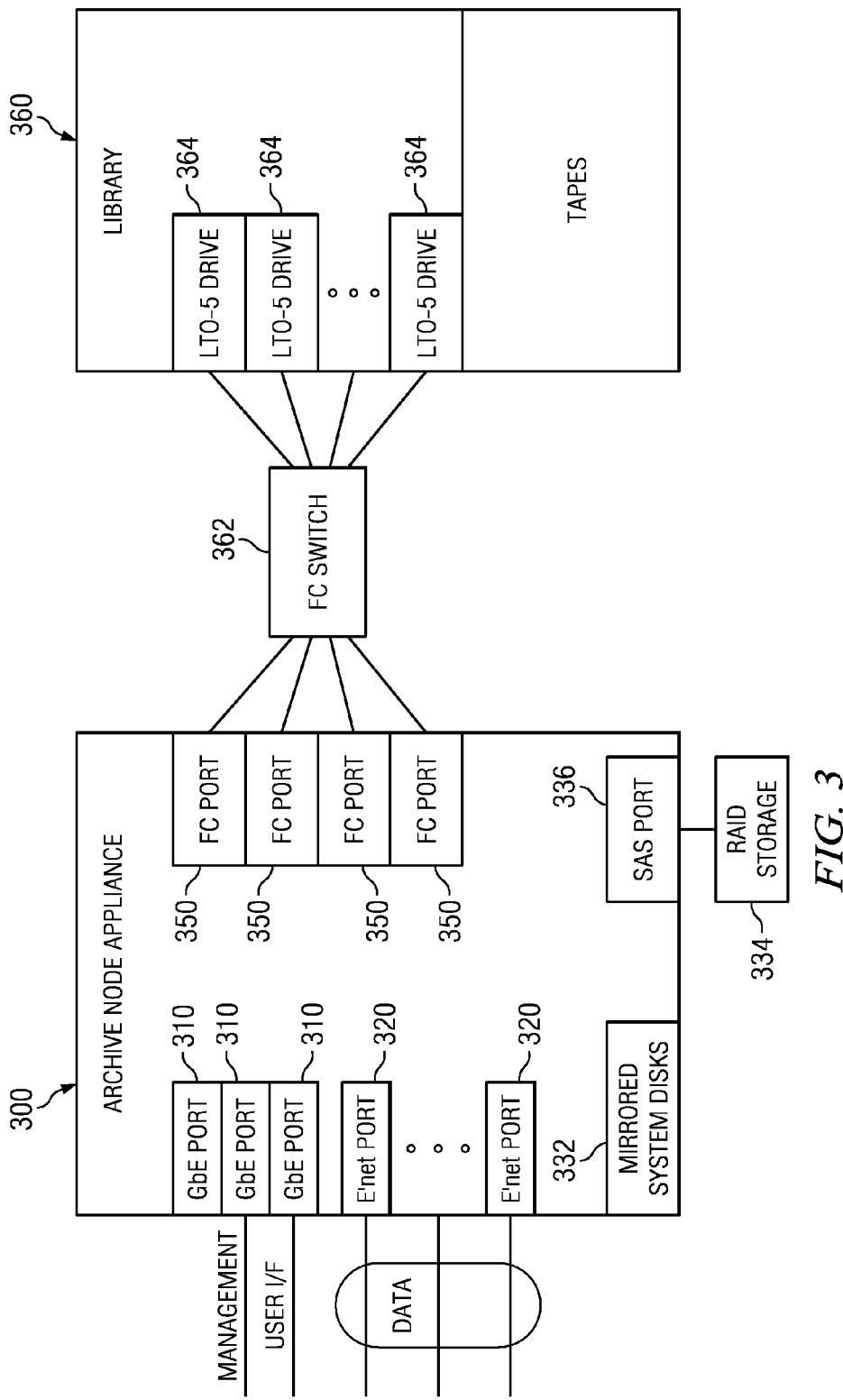
FIG. 3 is a diagrammatic representation of one embodiment of an Archive Node Appliance.

Moving on, FIG. 3 depicts one embodiment of an architecture for an Archive Node that may be used in instances where relatively greater storage capacity is required, such as in, for example, large data installations or a cloud storage provider. In this embodiment, the Archive Node Appliance 300 may comprise one or more Gigabit Ethernet ports 310. These Gigabit Ethernet ports 310 may be dedicated to providing a user interface or for a systems management interface. The Archive Node Appliance 300 may also comprise one or more Ethernet ports 320 for data connections. These Ethernet ports may be 10BASE-T, 100BASE-TX, 1000BASE-T, 10 GBASE-LR, 10 GBASE-LW, 10 GBASE-LRM, 10 GBASE-ZR, 10 GBASE-LX4, 10BASE-CX4, etc. or may be of a mixture of types. In operation these Ethernet ports 320 may be coupled to hosts, such that a network based file system may be provided by the Archive Node Appliance 300 and hosts may interface with the Archive Node Appliance 300 using these Ethernet ports 320 to utilize the network based file system, for example, by storing or retrieving files using the network based file system. As noted above, the network based file system may be implemented using a file system implemented in association with user space such as the Filesystem in Userspace (FUSE) file system; using a kernel-based file system such as Ext2, Ext3, Ext4 Next3, etc.; or almost any other type of file system desired. Archive Node Appliance 300 also includes a data store 334. Data store 334 may be a computer readable memory used to store computer executable instructions, files stored using the network based file system or other data utilized by Archive Node Appliance 300. To ensure redundancy or fault tolerance, data store may comprise a mirrored system disk 332 comprising the computer executable instruction and other data utilized by the Archive Node Appliance 300 during operation and Redundant Array of Independent Disks (RAID) storage 334 coupled to the Archive Node Appliance 300 through SAS port 336. The RAID storage may be used to store files associated with the network based file system and may have around 9 TB-150 TB of available storage. Archive Node Appliance 300 also comprises fibre channel ports 350 through which the Archive Node Appliance 300 is coupled to media library 360 via a fibre channel switch 362. These fibre channel ports 350 may be, for example, 16, 8, 4 or 2 GB fibre channel ports. Media library 360 may be an IBM TS3500 tape library having one or more LTO-5 compliant drives 364 and capable of holding around 20,000 tapes.

Again, while it should be noted that Archive Node Appliance 300 may be implemented in substantially in any form factor desired, in one embodiment Archive Node Appliance 300 may be based on a rack-mount storage format and may for example, be contained chassis of a 1 U, 2 U or 3 U form factor with the data store residing internally to the chassis or portions of the data store, such as the RAID storage residing external to the chassis.

Figure 4:
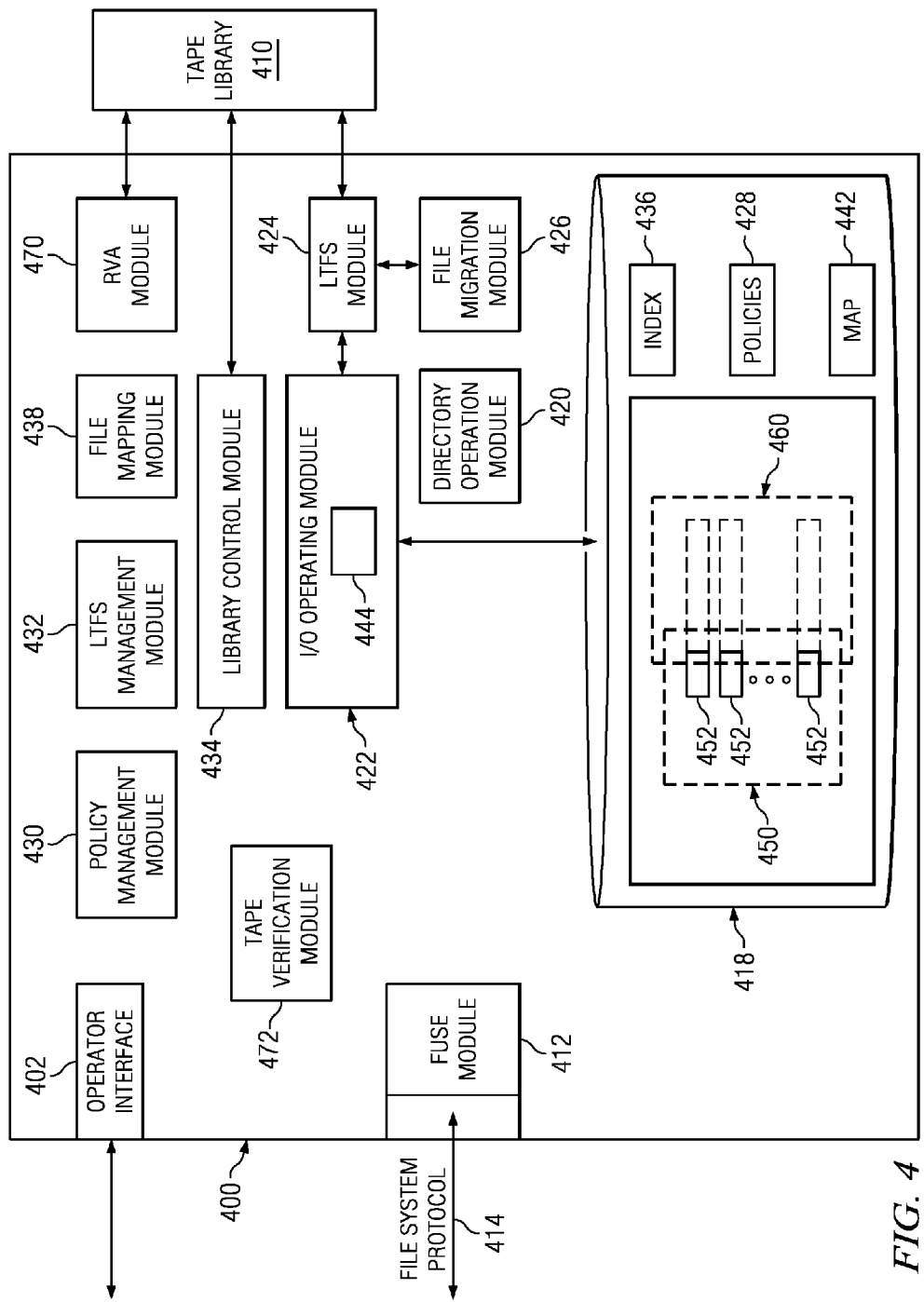
FIG. 4 is a diagrammatic representation of one embodiment of an Archive Node Appliance.

Turning now to FIG. 4, one embodiment of a functional architecture for an Archive Node is depicted. Archive Node Appliance 400 may provide an operator interface 402 through which the Archive Node Appliance 400 may be configured. Such an operator interface 402 may be provided, for example, using a network based interface such as a set of web pages or the like. Archive Node Appliance 400 is coupled to tape library 410, comprising a set of LTO-5 compliant drives and LTFS formatted tapes. In one embodiment, each tape in tape library 410 may be used to store data that is compressed, data that is encrypted or data that is neither compressed nor encrypted.

Archive Node Appliance 400 comprises Filesystem in Userspace (FUSE) module 412 that may present one or more shared volumes (e.g., as a hierarchical file system with directories, etc.) that can be accessed using an interface that operates according to network file system protocol 414 such as NFS, CIFS, etc. Data associated with the shared volumes presented by the FUSE module 412 is stored on one or more partitions of data store 418 (a computer readable memory), where the structure of the partitions of the data store 418 used to present these shared volumes may, or may not, correspond to the structure of the shared volumes presented by the FUSE module 412.

Directory operations module 420 is configured to process any directory operations that are received by FUSE module 412. I/O operations module 422 is configured to process any input or output operations involved with the reading or the storing of files associated with the network based file system presented by the FUSE module 412. These operations include, for example, the writing of files to the data store 418, the reading of files from the data store 418, the deletion of files from the data store 418, the reading of files from a tape in the tape library 410 or other operations associated with the data store 418 or tape library 410.

These I/O operations may involve the use of library control module 434, LTFS module 424, LTFS management module 432 and index 436. The location of each tape within the tape library 410 may be maintained in index 436 (e.g. in which slot or drive each tape is located, in which library the tape is located if multiple tape libraries are in use, etc.). Additionally, in one embodiment, what type of data is stored on each tape (encrypted, compressed, neither encrypted nor compressed, etc.) may also be maintained.

Library control module 434 is configured to control the movement of the tapes in the tape library 410, including ejecting the tapes from the drives of the tape library 410, and the movement of tapes to and from slots of the tape library 410 and in and out of drives of the tape library using the robot. LTFS management module 432 is configured to mount or unmount the LTFS file system on a particular tape in a drive of the tape library 410. LTFS module 424 is configured to perform LTFS operations with respect to an LTFS mounted file system.

Library control module 434, LTFS module 424, LTFS management module 432 and index 436 may also be utilized by file migration module 426. File migration module 426 is configured to move files from data store 418 to tape library 410 based on policies 428. File mapping module 438 maintains map 442 which correlates a file visible through the network based file system to its corresponding location in the tape library 410. Specifically, a mapping between the location (for example the path) and name of the file with respect to the network based file system, the name and location of that file in the data store 418 and the name and location of that file on one or more tapes in the tape library 410 may be maintained in map 442.

Policies 428 may, or may not be, user configured and may be associated with storage of the files or the migration of files from the data store 418 to tapes in the tape library 410. Such policies may specify, for example, how long to wait before migrating a file (referred to herein as a migration timeout period), whether the files are to be replicated when migrated (e.g. stored in conjunction with multiple Archive Nodes as will be elaborated on in more detail), how many copies of the file to keep (where the two copies may be kept on different tapes), whether the file is to be encrypted or compressed, etc. The policies 428 may be defined with respect to the shared volumes or directories presented with respect to the network based files by FUSE module 412 such that those policies may be defined with respect to all files within that directory or share. Policy management module 430 allows these policies to be managed (e.g., created, updated, defined, deleted, modified, etc.) by a user or otherwise.

In operation then, Archive Node Appliance 400 may present a network based file system accessible through an interface, where the files associated with the network based file system may be stored on the tape library 410 according to a file system structure that substantially mirrors the file system structure of the presented network based file system. In one embodiment, mirroring the file system structure of the presented network based file system means that at least a portion of the path of the location of the file as it is stored on the tape library 410 may be substantially similar to the path of the location of the file as it is presented through the network based file system.

More specifically, users at host devices coupled to the Archive Node Appliance 400 may perform directory operations and store or read files using an interface for the network based file system provided by the Archive Node Appliance 400. In accordance with these user initiated operations, commands in the network file system protocol 414 employed by the interface may be received at the Archive Node Appliance 400 and implemented by FUSE module 412 with respect to the partitions of data store 418. If the command is associated with a directory operation it may be processed by directory operations module 420. If the command is for the storing of a file, the I/O operations module 422 may write this file to a location in the data store 418. Map 442 may be updated to comprise a mapping between the location and name of the file with respect to the network based file system and the name and location of that file in the data store 418.

In one embodiment, the file is stored in the data store 418 according to the one or more policies that apply to that file. For example, if a policy that applies to the file specifies that the file should be compressed the file may be compressed before the file is stored in the data store 418. Similarly, if an applicable policy specifies that the file is to be encrypted the file may be encrypted before it is stored in the data store 418. In certain embodiments, a self-encrypting disk, full disk encryption or a RAID controller which performs encryption may be utilized in conjunction with data store 418, such that all files stored in the data store 418 may be encrypted by the disk or controller when the file is stored to the data store 418.

In such cases, all files stored to the data store 418 may be encrypted when stored to data store 418 and decrypted when read from data store 418.

Based on one or more of the policies 428, at some later point a file may be migrated to the tape library 410. As policies 428 may be defined based on a location associated with the presented network based file system, policies associated with the location (e.g. directory, share, etc.) where the file is stored may be determined from policies 428 and the determined policies applied to migrate the file.

As the file may be received over a network, errors may occur during the transmission of the file or the storage of the file to the data store. To account for network errors or the like, in one embodiment, a time period referred to as the migration timeout period is utilized. More specifically, when a file is first stored to the data store an amount of time equal to the migration timeout period may be allowed to elapse before the file is migrated. As discussed above, such a migration timeout period may be implemented as a policy. Thus, for example, a policy defining such a migration timeout period may be associated with a share or directory as visible through the network based file system implemented by the Archive Node Appliance.

In any event, once a file is selected for migration, the one or more policies 428 associated with that file may be utilized to migrate the file accordingly (e.g., encrypted, compressed, neither encrypted nor compressed, whether multiple copies of the file are to be maintained, if the file is to be replicated, etc.).

An appropriate tape on which to store the file may be determined and located using the index 436. If the appropriate tape is not currently in a drive of the tape library, library control module 434 may be utilized to load the appropriate tape into a drive of the tape library 410. More specifically, in most cases when an LTFS tape is formatted it is specified whether the data on that tape is to be compressed or not. Thus, the selection of an appropriate tape may include selecting a tape that is formatted according to a policy specified for the file being migrated (e.g., a tape formatted to hold compressed data may be selected if a policy specifies the file is to be compressed, etc.), selecting a tape that has a location associated with a location where the file is to be stored (e.g., a directory in the path of the location where the file is to be stored, etc.), etc. The selection of an appropriate tape may also involve other considerations not expressly enumerated.

The file system on the appropriate tape may be mounted using LTFS management module 432. File migration module 426 may use LTFS module 424 to copy the file from data store 418 to the appropriate tape at a location on the tape which corresponds to the location of the file as presented through the network based file system to the host devices coupled to the Archive Node Appliance. After the file is copied to the tape, all, or a portion of, the file may be deleted off of the data store. Accordingly, the migration may entail the creation of one or more directories on the mounted LTFS file system on the tape, where these directories may mirror the directories in the path where the file is stored that are visible to a user at a host device using the network based file system presented by the Archive Node Appliance 400. Additionally, when the file is copied to the mounted LTFS file system on the appropriate tape, actions may be taken to implement policies applicable to the file.

For example, if a policy that applies to the file specifies that the file should be compressed, the file may be compressed before the file is stored on the appropriate tape. In one embodiment, the use of LTFS may simplify this compression. Specifically, if a file is to be compressed the selection of an appropriate tape formatted to store compressed data may indicate to the LTFS module 424 that data to be stored on the tape is to be compressed. The LTFS module 424 may configure the drive holding that tape to compress data such that when the file is stored to the tape using LTFS module 424 it is compressed before it is stored.

Similarly, if an applicable policy specifies that the file is to be encrypted the file may be encrypted before it is stored on the appropriate tape. As LTFS may not support encryption, in one embodiment, encryption of the file being stored may be accomplished by the tape drive in which the appropriate tape is located. Specifically, before mounting the LTFS file system on the appropriate tape one or more commands (for example, SCSI or other types of commands that may or may not include key information to be utilized) may be sent to the drive to cause it to use encryption. The LTFS file system can then be mounted on the tape. LTFS can then be used to store the file on the tape while the tape drive handles the encryption of the data transparently to LTFS.

Other embodiments may accomplish compression or encryption of the files in different manners. For example, in one embodiment, to speed the migration of files, Archive Node Appliance may provide hardware support for such encryption or compression. Embodiments of methods and systems for such encryption or compression are discussed in U.S. patent application Ser. No. 12/025,081, entitled "System and Method For Enabling Encryption", by Robert C. Sims, filed on Feb. 4, 2008 which is hereby incorporated by reference for all purposes.

Additionally, if a policy 428 associated with the file specifies that multiple copies of a file are to be maintained a second tape on which to store the file may be determined and the file migration module 426 may use LTFS module 424 to copy the file from data store 418 to the second tape at a location on the second tape which corresponds to the location of the file as presented through the network based file system to the host devices coupled to the Archive Node Appliance 400. Notice here that two separate tapes may have the file stored using an LTFS file system path that mirrors the path of that file as presented through the networked based file system presented by the Archive Node Appliance. Furthermore, if a policy associated with the file specifies that the file is to be replicated the file may also be sent to another Archive Node Appliance, as will be discussed in more detail.

When a command to read a file is received, map 442 may be consulted to determine the location of the file (e.g., whether it is located in data store 418, on a tape in the tape library 410 or both). If the requested file is completely on the data store 418, I/O operations module 432 may respond to the read of the file using the file as stored in the data store 418. If the file is on a tape (and not entirely in the data store 418), the tape on which the file is located may be determined using the map 442. The index 436 and the library control module 434 can then be utilized to determine if the tape is in a drive, and if not, to load the appropriate tape into a drive of the tape library 410. The file system on the tape may be mounted using LTFS management module 432. I/O operations module 422 can then use LTFS module 424 to access the file on the tape and respond to the read of the file.

It will be noted here that certain actions may be taken in association with the read file before the file is used to respond to the read. In particular, in certain embodiments, actions associated with one or more policies applicable to the file may be performed. For example, if a policy that applies to the file specifies that the file should be compressed, the file may be decompressed after the file is read from the tape and before the file is used to respond to the read of the file. In one embodiment, the use of LTFS may simplify this decompression. Specifically, the tape on which the file is stored may be formatted to store compressed data. The presence of this type of tape in the drive may indicate to the LTFS module 424 that data stored on the tape is compressed. The LTFS module 424 may thus configure the drive holding that tape such that when the file is read from the tape using LTFS module 424 it is decompressed.

Similarly, if an applicable policy specifies that the file is to be encrypted the file may be decrypted before the file is used to respond to the read of the file. As LTFS may not support encryption, in one embodiment, decryption of the file being stored may be accomplished by the tape drive in which the appropriate tape is located. Specifically, before mounting the LTFS file system on the tape on which the file is stored one or more commands (for example, SCSI or other types of commands that may or may not include key information to be utilized) may be sent to the drive to cause it to decrypt the file. The LTFS file system can then be mounted on the tape. LTFS can then be used to read the file while the tape drive handles the decryption of the data transparently to LTFS. The file is then used to respond to the read of the file.

In many cases, however, if the file is located on tape, it may take a relatively long amount of time to access the file. This situation may be exacerbated if, for example the file system on the tape is not currently mounted, the tape itself is not currently in a drive of the tape library, the tape is currently positioned at a location far away from the location where the file is located, etc. These conditions can result in an access time for a file on tape that is on the order of minutes.

Many network based file system protocols have timeout conditions. For example, in the CIFS protocol, an OPEN or a READ command must be responded to within 30 seconds or a timeout condition will occur. Thus, the time period for responding to such a command may be less than that needed to access the file on the tape. In order to present network based file systems based on these types of protocols such conditions may need to be addressed.

To that end, in some embodiments, read cache 450 may be maintained on data store 418. Read cache 450 may comprise the first portion 452 of each file stored using the network based file system presented by the Archive Node Appliance 400. When a file is read, then, if any portion of the file is to be read from tape the first portion 452 of the read file that is stored in the read cache 450 may be used to respond to the read, while substantially simultaneously accessing the file on the tape. Since the first portion 452 of the file is stored in the read cache 450 on the data store 418 it can be accessed quickly enough that a timeout on commands can be avoided while the file on the tape is accessed. The remainder of the file can then be read from the tape and used to respond to the commands. The size of the first portion 452 of each file may be user configurable, based on system parameters, or defined in some other manner.

It will be noted that the read cache 450 may comprise first portions 452 of none, all, or some subset of, the files that are stored in conjunction with the network based file system. For example, if data store 418 is corrupted or otherwise unusable, when the data store 418 is replaced read cache 450 may comprise first portions 452 of none of the files. The read cache 450 may then be repopulated as files are accessed by users through the network based file system. During this repopulation then, read cache 450 may comprise first portions 452 of some subset of the files that are stored in conjunction with the network based file system.

Accordingly, in some embodiments, when a file is read if any portion of the file is to be read from tape it can be determined if the first portion 452 of that file is in the read cache 450. If it is that first portion 452 may be used to respond to the read as detailed above. If, however, the first portion 452 of the read file is not in read cache 450, the file may be read from tape and used to respond to the read. Additionally, the file data read from tape may be used to repopulate the read cache 450 by storing the first portion 452 of the read in the read cache 450 at that time (embodiments of which will be discussed in more detail below).

In one embodiment, as a CIFS command may have a 30 second timeout period and an average or poor timing scenario for a tape access may be on the order of 4 minutes, the first portion 452 of each file stored in the read cache 450 may comprise the first 512K of each file. It will be noted that the data in the read cache 450 may be stored in a manner corresponding to the format in which the file is stored on the tape. Thus, for example, if the file is compressed when it is migrated to tape the read cache 450 may comprise the first portion 452 of the file in compressed format, where this first portion equals approximately 512 k of data when uncompressed.

Initially then, when a host device using a CIFS based file system provided by the Archive Node Appliance wishes to read a file it may send an OPEN command to the Archive Node Appliance 400. I/O operations module 422 may determine if the requested file is completely in the data store 418 using map 442. If so, I/O operations module 422 may respond to the read of the file using the file in the data store 418.

If however, the file is on a tape, the tape on which the file is located may be determined using the map 442. The I/O operations module 422 can then initiate the load and access of the file on the tape using the library control module 434 and the LTFS management module 432. I/O operations module 422 delays the response to the initial OPEN command for a time period less than the timeout associated with the received command. In some embodiments, this time period may be the longest time period that does not result in a timeout occurring (e.g., 29 second, 29.9 seconds in the case of CIFS commands, or another time period in the case of commands in other protocols, etc.).

The host device may subsequently send a READ command for a certain amount (e.g., 64K or a different amount) of the file to the Archive Node Appliance 400. I/O operations module 422 delays the response to this READ command as long as possible without a timeout resulting (e.g., 29 second, 29.9 seconds, in the case of CIFS commands, or another time period in the case of commands in other protocols, etc.) before responding to the READ command using the requested amount of data from the first portion 452 of the requested file in the read cache 450. The I/O operations module 422 may continue to delay responses to subsequent READ commands and utilize data from the read cache 450 to respond to the READ commands until data from the first portion 452 is exhausted or the LTFS file system on the appropriate tape is mounted and the file on the tape can be accessed using LTFS module.

I/O operation module 422 may then use LTFS module 424 to access the file on the tape and respond to subsequent READ commands for the file. More specifically, in one embodiment I/O operations module 422 may utilize LTFS module 424 to access the file on the appropriate tape and read the file from the tape into buffer 444. Subsequent READ commands for the file may be responded to using the data in the buffer 444.

Furthermore, in some embodiments, in addition to reading the file into buffer 444 the file may also be read into a file cache 460 on the data store. File cache 460 may be an area on data store utilized for temporary storage of files and may be managed according to almost any cache management technique desired. In certain cases if a host does not request data of the file at a particular rate (e.g., does not issue READ commands frequently enough, o the READ commands do not request a certain amount of data, etc.), after a certain number of READ commands I/O operations module 422 may respond to subsequent READ commands for the file using data of the file from the file cache.

In certain embodiments the opposite may also occur. More specifically, in some instances the reading of file data to the file cache 460 in addition to reading the file into buffer 444 may slow the response to requests for data from the host. In this case, reading the file data into both buffer 444 and file cache may mean that data cannot be delivered at the rate the user is requesting the data or may otherwise slow the response to user requests. Here, the reading of the data of the file into the file cache 460 may be stopped before the entire file is in the file cache such that requests for the file may be serviced more quickly. Thus, the portion of the file that is in file cache 460 may comprise none, some, or all, of a file.

In one embodiment, the file may be stored in the file cache 460 by appending any portions of the file which are read from the tape to the first portion 452 of the file in the read cache 450 if such a first portion of the read file exists in read cache 450. Thus, if the first portion 452 exists in the read cache 450 when any portion of the file not comprised by first portion 452 in the read cache is read from the tape it may be appended to the first portion 452 already stored in the read cache 450. In either case (the first portion 452 does, or does not, exist in the file cache) the entire file may be stored in the file cache 460 when the file is read. Thus, at a later point, if portions of the file are deleted from the file cache 460 the first portion 452 of the file may be left on the data store 418 such that the first portion 452 of the file is in read cache 450. Accordingly, the read cache 450 will be repopulated with the first portion of that file if the first portion 452 was not in the read cache 450 before the file was read.

As can be seen then, an Archive Node Appliance can implement a network file system using tape library, where the use of such a tape library is abstracted such that it is substantially invisible to a user. As data integrity may be of significant importance to users of a network based file system, however, it may be desired to additionally provide functionality that may ensure data integrity through verification of tapes in the tape library. Accordingly, embodiment of the Archive Node Appliance may include read verify module 470, where the read verify module 470 may collect statistics about the tape library 410, perform tape verification task and generate alerts for events of interest. Operator interface 402 may provide the ability for a user to control the functionality or configuration of the read verify module 470 and through which alerts may be communicated to the user.

Embodiments of methods that may be employed by read verify module 470 are discussed in U.S. patent application Ser. No. 11/801,809, entitled "Method and System for non-intrusive Monitoring of Library Components" filed May 11, 2007, U.S. patent application Ser. No. 12/024,755, entitled "Media Library Monitoring System and Method," filed Feb. 1, 2008 and issued as U.S. Pat. No. 7,908,366 on Mar. 15, 2011, U.S. patent application Ser. No. 12/025,436, entitled "System and Method for Archive Verification," filed Feb. 4, 2008, U.S. patent application Ser. No. 12/024,322, entitled "System and Method of Network Diagnosis," filed Feb. 4, 2008, now allowed, U.S. patent application Ser. No. 13/091,877, entitled "System and Method of Network Diagnosis," filed Apr. 21, 2011, U.S. patent application Ser. No. 12/024,300, entitled "Determining, Displaying, and Using Tape Drive Session Information," filed Feb. 4, 2008, U.S. patent application Ser. No. 12/888,954, entitled "System and Method for Eliminating Performance Impact of Information Collection from Media Drivers," filed Sep. 23, 2010, U.S. patent application Ser. No. 12/692,403, entitled "System and Method for Identifying Failing Drives or Media in Media Library," filed Jan. 22, 2010, U.S. patent application Ser. No. 12/861,609, entitled "System and Method for Archive Verification According to Policies," filed Aug. 23, 2010, U.S. patent application Ser. No. 12/861,612, entitled "System and Method for Archive Verification Using Multiple Attempts," filed Aug. 23, 2010, and U.S. patent application Ser. No. 12/025,181, entitled "System and Method for Enabling Encryption," filed Feb. 4, 2008, which are incorporated fully herein by reference for all purposes. However, it may be useful to discuss some embodiments of read verify functionality that may be implemented by tape verification module 472 using read verify module 470.

In one embodiment, tape verification module 472 may control any and all verification processes done using read verify module 470 which may perform verification and send verification data such as status information to the tape verification module 472. That status information may, for example, be general (e.g., for an entire tape, file, directory, etc.) or specific (e.g., for every block of a particular tape that has errors, an indication of the count of soft and hard errors). Other types of verification and verification data are possible and contemplated herein.

Tape verification module 472 may utilize read verify module 470 to provide archive verification for one or more libraries or verify library media. This verification may be accomplished using verification policy (which may, or may not, be part of policies 428). The verification policy can specify archive verification parameters such as the duration between verifying tapes, the acceptable number of read errors or other parameters.

In one embodiment, tapes (or other media) in library 410, files, etc. may be verified according to a verification policy. In one example, the verification policy may stipulate that individual tapes are to be verified periodically, such as every 90 days. Thus, as stipulated by the verification policy, the tape verification module 472 may verify tapes every 90 days. The tape verification module 472 may keep track of how much time has elapsed since tapes in a library have been verified and if the read verify module 470 determines that 90 days have elapsed since a particular tape was last verified, the tape verification module 472 may verify that particular tape. Reading data on a tape causes tape wear, thus a period between verifications may be chosen which minimizes wear while allowing for satisfactory verification of media. One such period may be 90 days, but other periods may be chosen. Periods between verification may be the same for all media in a library or may be different for one or more media or classes of media. For example, older tapes may be verified more often than newer tapes.

In one embodiment, the tape verification module 472 is able to determine the time elapsed since a particular tape was verified because the tape verification module 472 uses the read verify module 470 to query the state of the library 410 over time and uses data regarding the state of the library to track tapes and the operations associated with the tape. Tracking tapes and maintaining information regarding tapes is described in U.S. patent application Ser. No. 11/801,809, entitled "Method and System for Non-Intrusive Monitoring of Library Components," filed May 11, 2007, and U.S. patent application Ser. No. 12/024,755, entitled "Media Library Monitoring System and Method," filed Feb. 1, 2008, issued as U.S. Pat. No. 7,908,366 on Mar. 15, 2011, both of which are hereby incorporated by reference. In another embodiment, all tapes in a library or a known subset of tapes in a library are verified periodically. For example, a periodic verification window can be allocated for periodic archive verification and all tapes in a library or a known subset of tapes can be verified during the verification window. Such verification may utilize all or most of the drives in a library. Because all tapes in a library or a known subset of tapes in a library are verified, the tape verification module 472 can verify tapes based on an internal clock or other timing device.

Thus Verify, Read, Log Sense (LS) or Read Attribute commands can be sent from read verify module 470 to library 410. Verification data generated in response to the commands from library 100 is sent to read verify module 470 which may compare the verification data against requirements contained in a verification policy and may store the verification data in the data store. By comparing the verification data against requirements of a verification policy and by comparing verification data against previous verification data regarding a particular tape stored in data store, the degradation of tapes can be monitored. Because read verify module 470 verifies tapes by sending commands to a library 410 or library devices such as drives or other devices, read verify module 470 does not need to intercept commands or responses from a network to verify tapes. This allows read verify module 470 to be non-intrusive and not interfere with commands from and responses to hosts.

To verify a particular tape in library 410, the read verify module 470 requests that library 410 load the tape to be verified in one of the drives, and sends a Verify command to the drive. A particular drive may be reserved for all verification operations. In response, library 410 loads the particular tape into a drive and the drive attempts to read data stored on the tape. In the course of reading data or attempting to read data on the tape, the drive may register read errors. Registering read errors increments a read error counter within the drive. Such a read error counter may be a buffer or other memory which is incremented when the drive registers a read error in the course of reading or attempting to read a tape. Read errors may be soft errors or hard errors. Soft errors may include flipped bits, corrupted data, damaged media sectors or other problems or issues. Read errors may also be hard errors indicating tape failure or damaged media sections. In one embodiment, the read error counter logs soft errors and hard errors in separate sections in the read error counter.

If the drive is able to read data stored on the tape and so verify the readability of the tape, the drive returns an indication of a successful verification to read verify module 470. Such an indication may be, for example, a command complete message. If, however, the drive is unable to read data stored on the tape or the tape, the drive may return an indication of a failed verification to read verify module 470. The inability to read a tape may be the result of a hard error or the failure of a command.

In addition to sending a Verify command to library 410, read verify module 470 may send a LS command to the drive in which the particular tape was loaded. In response to the LS command, the drive returns data associated with the drive being verified. Such data may include the number of read errors logged by the drive and may also include: utilization and performance data, data regarding the data read from the media, detail tables or other data. In one embodiment, data returned in response to a LS command or other command may be used to determine which sections of the media registered soft errors or could not be read by, for example, tracking the count of blocks. Such functionality may be implemented at the read verify module 470 or other device.

To verify one or more tapes, read verify module 470 may also utilize a Read command in much the same way that the Verify command was utilized as described above. The drive will, however, return the data read from the tape. Receiving read data from a drive serves to confirm that the drive is able to read a tape and data on a tape. Furthermore, it is possible to compare checksums against the data returned to ensure that the read data is correct. Other data verification algorithms may be performed on the returned data.

To verify the particular tape, a Read Attribute command may also be issued to the drive. In response to the Read Attribute command, the drive Medium Auxiliary Memory (MAM) data from the particular tape in the drive.

Based on the verification data (which may be, for example, data used to determine the reliability of media, such as data returned in response to a Verify command, Read command, LS command, Read Attribute command) returned from the drive, read verify module 470 can verify if the particular tape can be read and sections of the tape that can or cannot be read. According to one embodiment, in the context of read verify module 470, data returned in response to an LS command (e.g., the number of read errors registered by the drive) may be correlated with the tape such that the number of read errors (for example, soft errors or hard errors) registered by a drive while reading or attempting to read a particular tape can be correlated with that particular tape. In one embodiment, because a read verify module 470 can track which tape is in a drive when it issues a Verify command, a Read command, a LS command or other command, a subroutine running on the read verify module 470 can correlate the data received in response to the various commands to the particular tape.

Read verify module 470 can further save verification data over time in data store 418 which may be part of or extend to read verify module 470 or tape verification module 472. If the verification data for a particular tape exhibits an upward trend in read errors over time or if read errors are increasingly prevalent in a particular section of the tape, based on replacement rules in the verification policy, a warning may be issued to a user that the tape has degraded such that it is no longer reliable and that data on the tape should be transferred before it is corrupted or lost. Alternatively, tape verification module 472 may automatically begin a data transfer from a tape showing decreased reliability to another tape.

It may be useful to discuss embodiments of the storage of mapping data, index data, policies, file meta-data, tape-library data, etc. that may be utilized by an Archive Node Appliance. Embodiments of such storage methods and formats may be used, for example, to store the map, index and policies as discussed above. FIGS. 5A-5D depict one embodiment of a schema for a database that may be utilized in conjunction with embodiment of an Archive Node.

Figures 2, 5A:
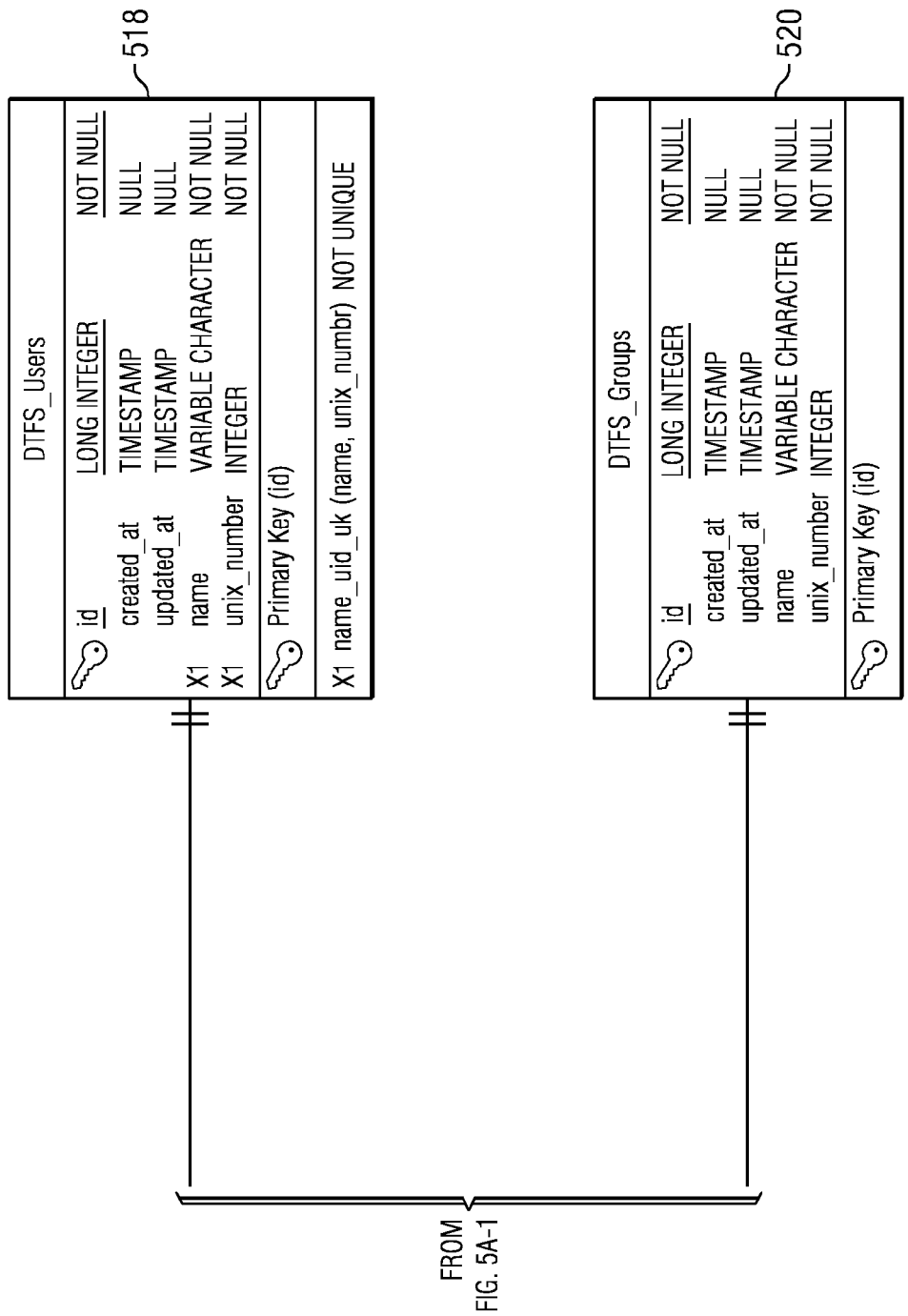
FIGS. 5A-5D are diagrammatic representation of one embodiment of a schema.
Figures 3, 5A:
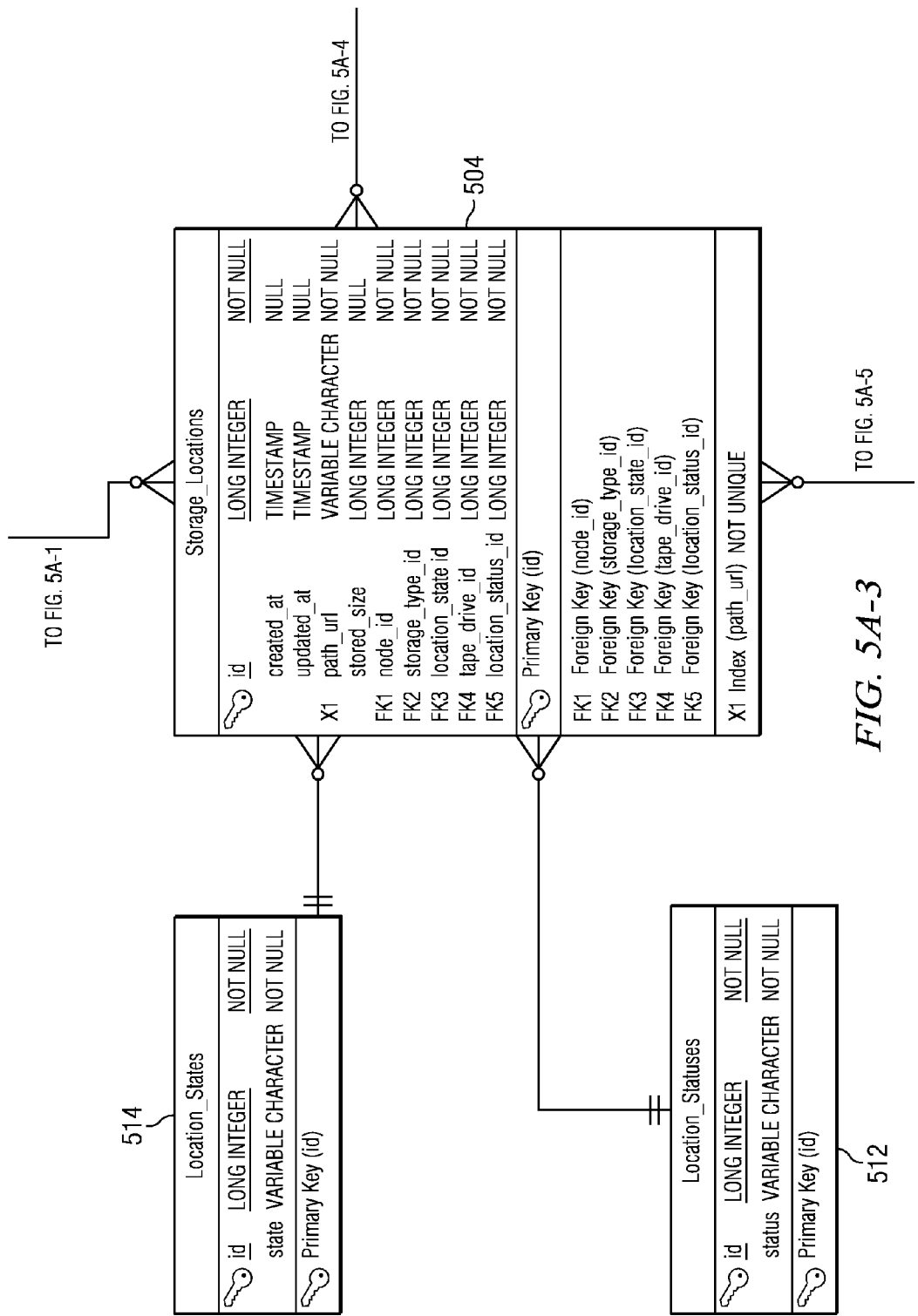
Figures 4, 5A:
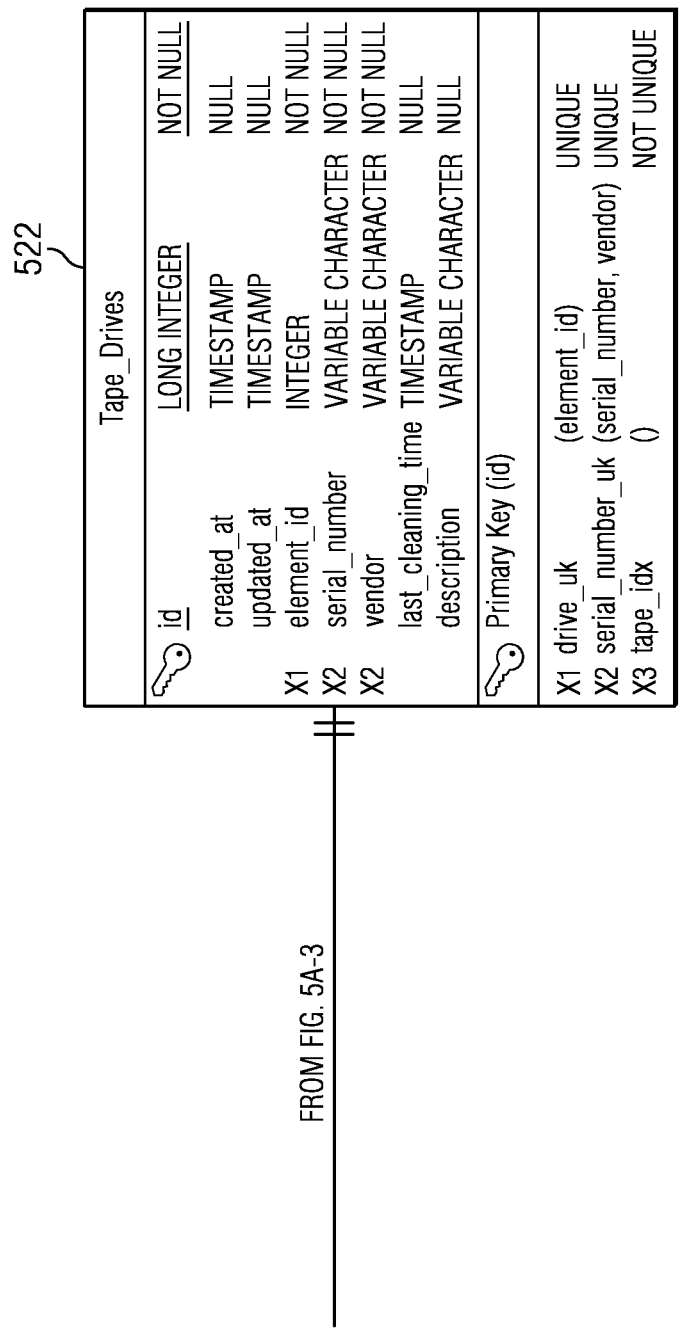
Figures 5, 5A:
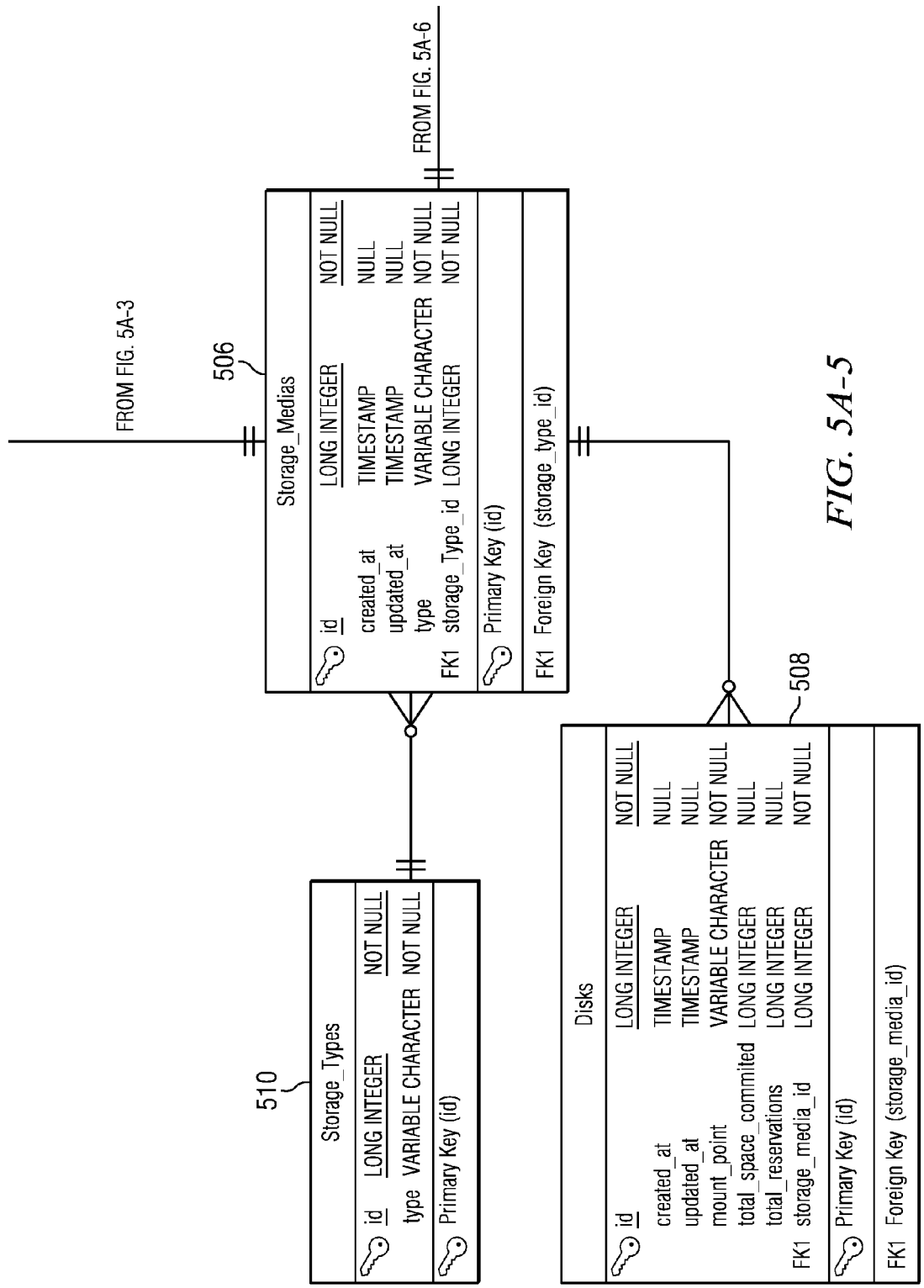

Turning first to FIG. 5A, one embodiment of a table schema for the storage of data relating to files and directories is depicted. In this schema, there is a node table 502, a storage location table 504, a storage media table 506, a disk table 508, a storage type table 510, a location statuses table 512, a Disk to Tape File System (used to refer to embodiments of an implementation of a file system using an Archive Node, also known by the acronym DTFS) settings table 516, DTFS users table 518, DTFS groups table 520, tape drives table 522, tapes table 524 and storage method types table 526.

Storage locations table 504 may comprise information on locations where data can be stored in conjunction with an Archive Node and thus entries in the storage location table 504 may be linked to entries in the storage media table 506. Entries in storage media may, in turn, be linked to entries in the disk table 508 that are associated with a data store of the Archive Node and entries in tapes table 524 that are associated with tapes in the tape library of the Archive Node. Entries in storage locations table 504 may also be linked to entries in tape drives table 522 that are associated with drives in the tape library of the Archive Node. Entries in the storage location table 504 may also be associated with a state and a status as represented by entries in the location states table 514 or the location statuses table 512.

Nodes table 502 comprises entries which are associated with a file or a directory as presented by the network based file system implemented by the Archive Node. Entries in the node table 502 are linked with entries in the DTFS users table 518 where these entries may represent users of the DTFS file system (which may be defined by an administrator, based on the network based file system implemented by the Archive Node, etc.). Each of the entries in node table 502 may also be linked with entries in the storage location table 504 such that a link between an entry in the node table 502 associated with a file or directory may be linked with one or more entries in the storage location table 504 associated with a disk or tape where that file or directory is stored.

Figures 1, 5B:
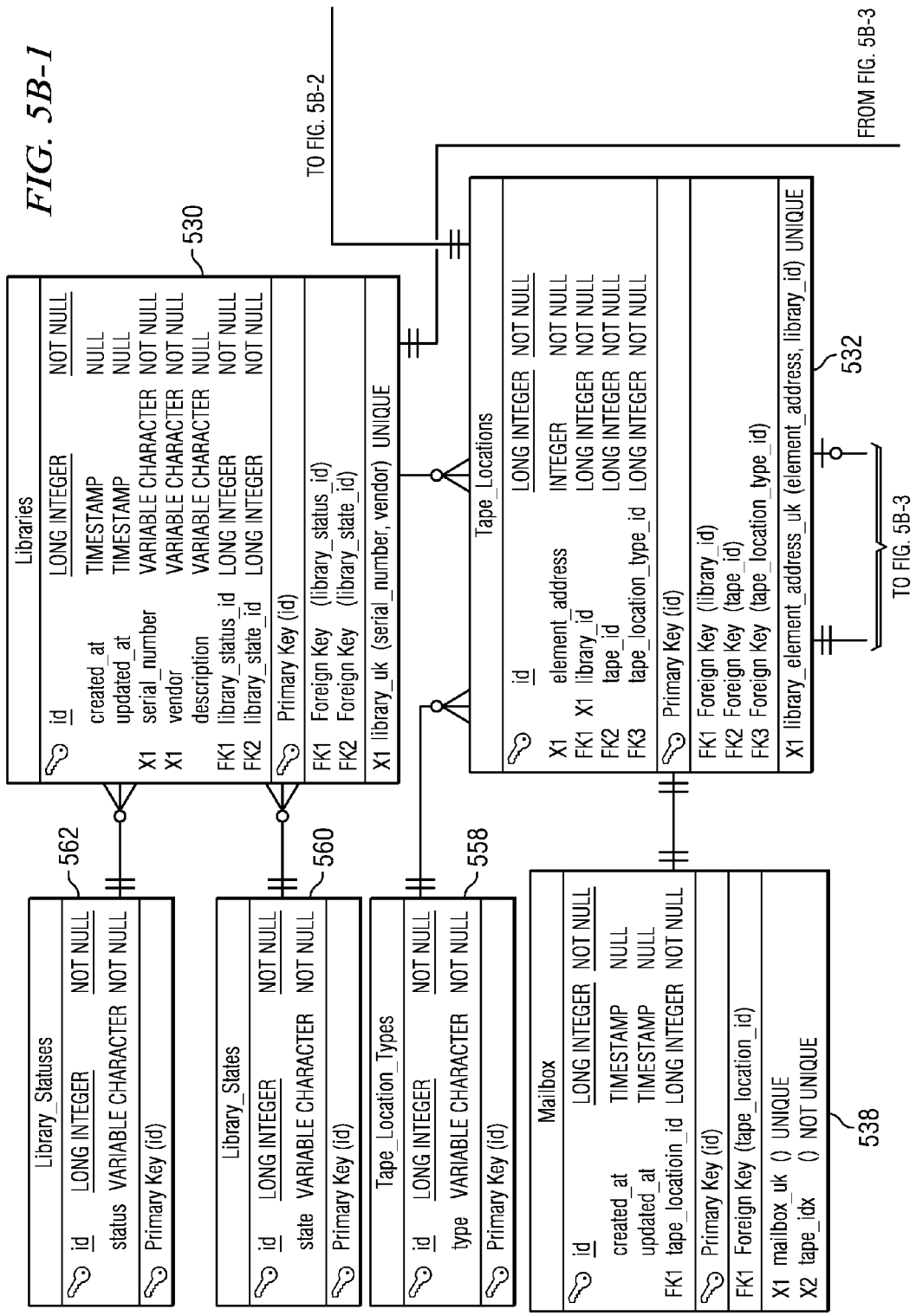
Figures 2, 5B:
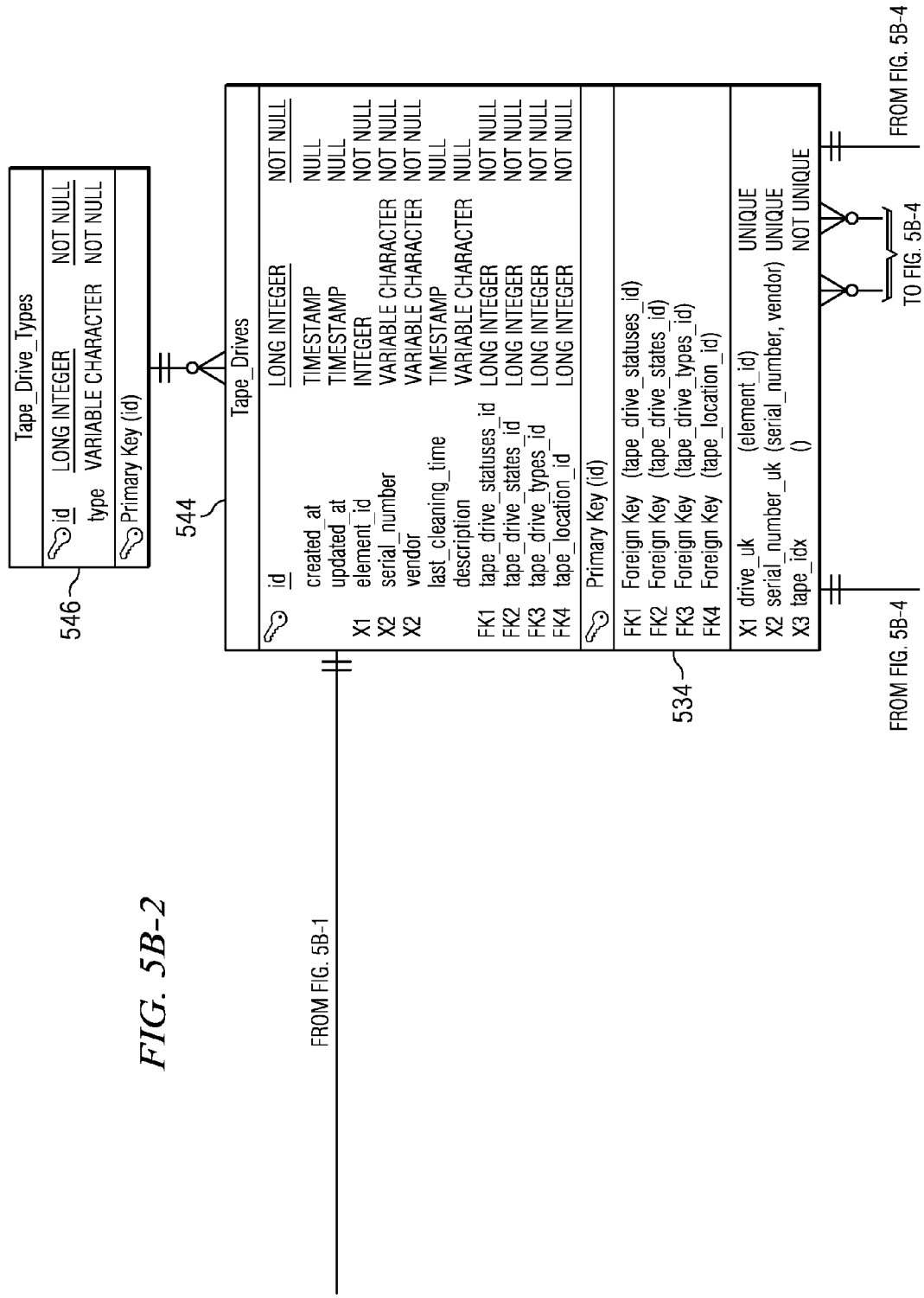
Figures 3, 5B:
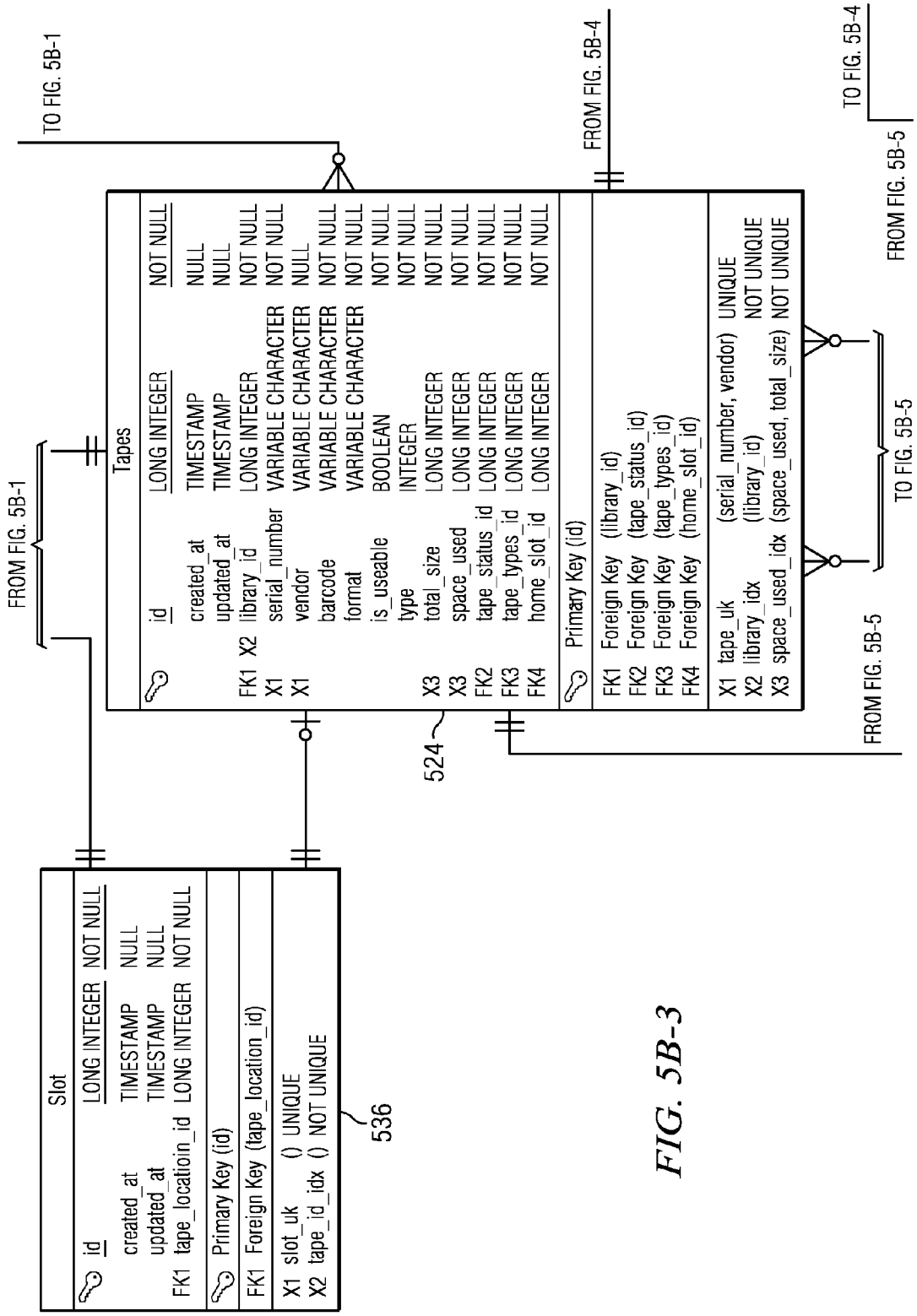
Figures 4, 5B:
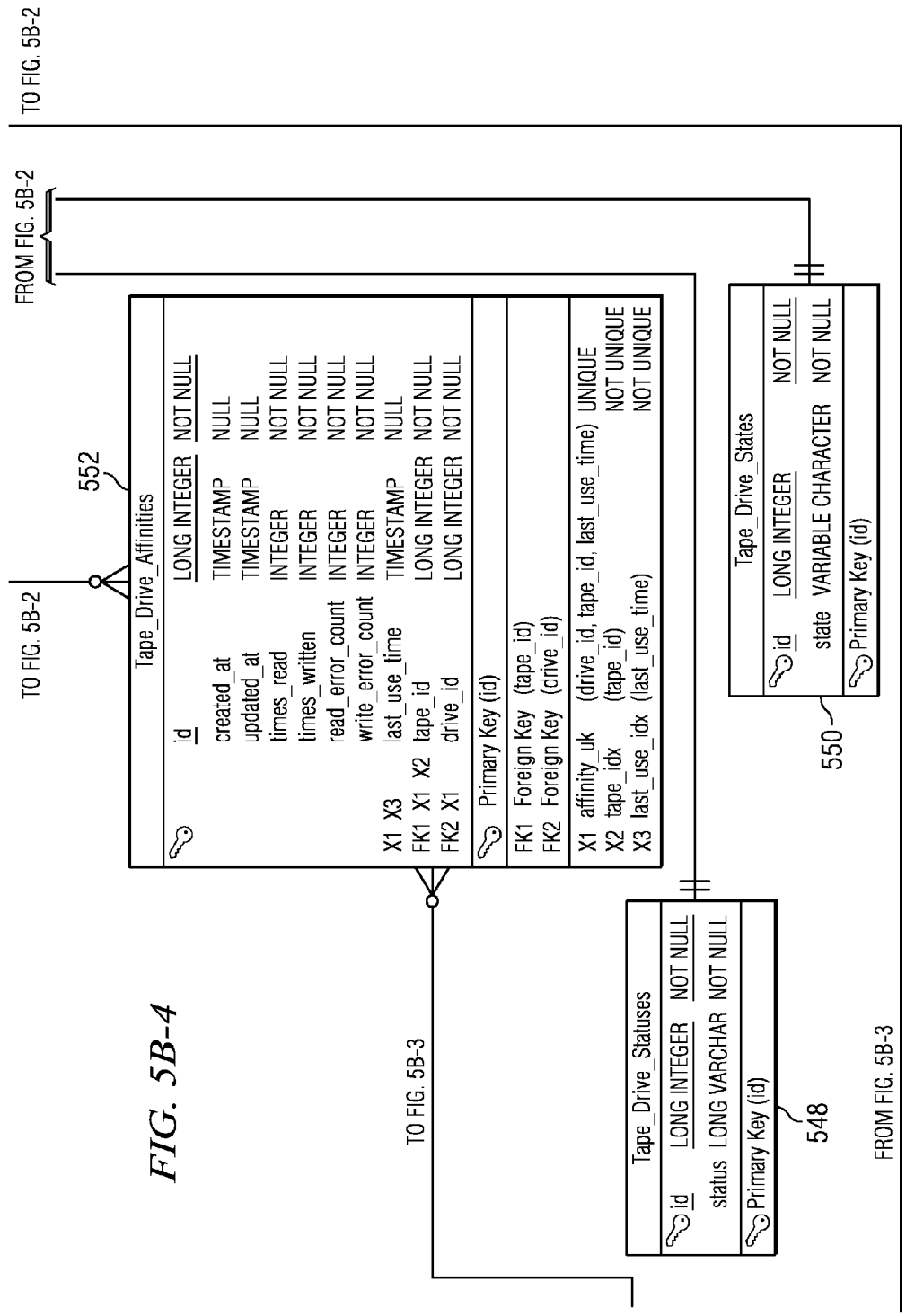
Figures 5, 5B:
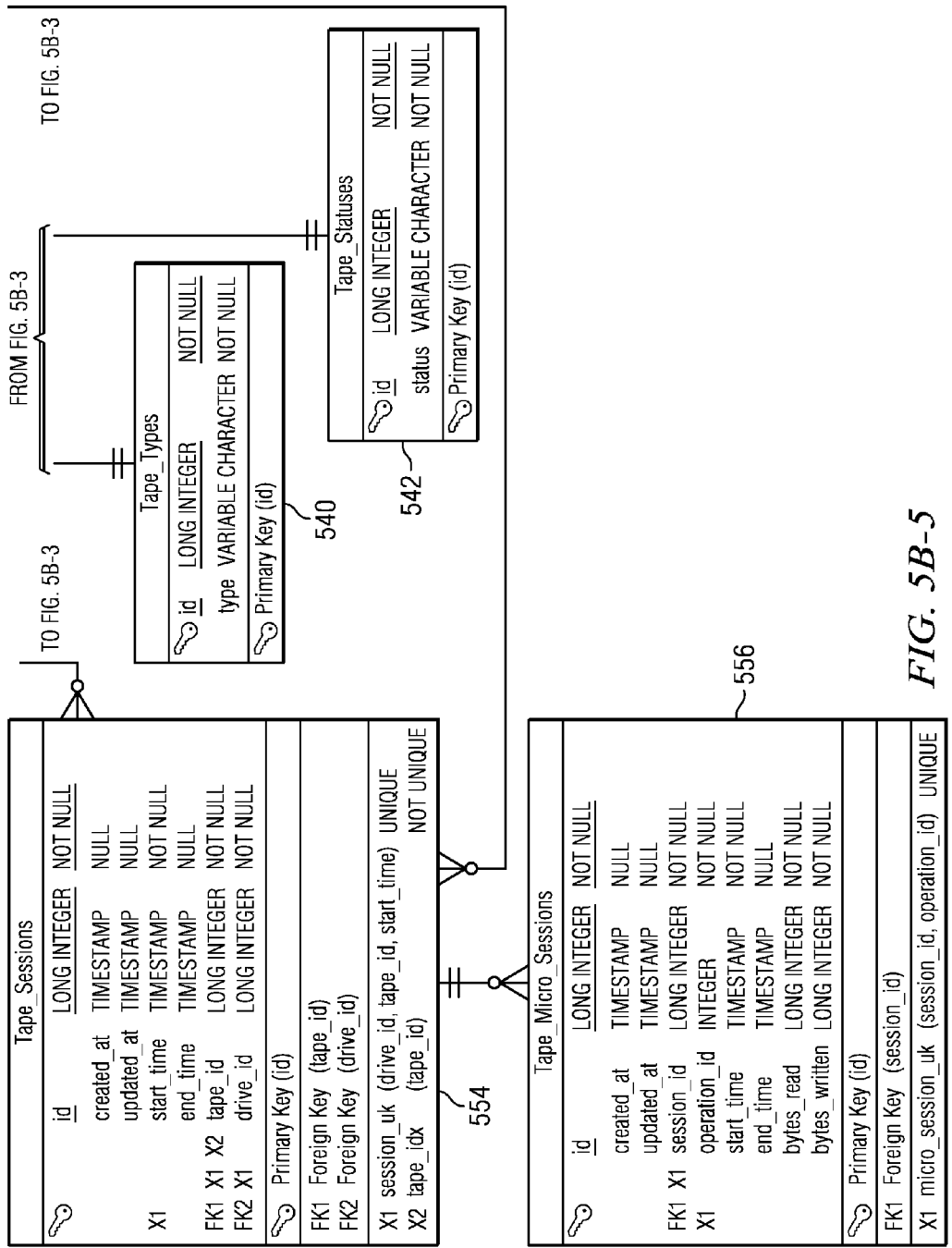

Moving now to FIG. 5B one embodiment of a table schema for the storage of data relating to tapes and tape libraries of an Archive Node is depicted. In this schema, there is a tapes table 524, tape locations table 532, libraries table 530, tape statuses table 542, tape types table 540, library statuses table 562, library states table 560, tape location types table 558, mailbox table 538, slot table 536, tape sessions table 554, tape micro sessions table 556, tape drive types table 546, tape drives table 534, tape drive affinities table 552, tape drive statues table 548 and tape drive states table 550.

Entries in tapes table 524 may be associated with an entry in tape locations table 532 associated with a location of tape in a tape library (for example, a slot, drive, etc.). Each of the entries in tape location table 532 may be associated with an entry in slot table 536 associated with a slot in a tape library or an entry in tape drives table 544 associated with a drive in the tape library. Furthermore, entries in tape locations table 532 and tapes table 524 are linked with an entry in libraries table 530 associated with a tape library of the Archive Node (of which there may be one or more, as discussed above). In this manner, an entry in tapes table 524 associated with a tape can be associated with an entry in library table 530, slot table 536 or tape drive table 544 associated with the location of that tape.

Entries in tape drive table 544 may be also linked to an entry in tape drive types table 546 associated with a type of the drive, or an entry in tape drive statuses table 548 or tape drive states table 550 associated with a statuses or state of a tape drive. Entries in tapes table 524 may also be linked to entries in tape status table 542 and tape types table 540 associated with a type or a status of a tape.

Figures 2, 5C:
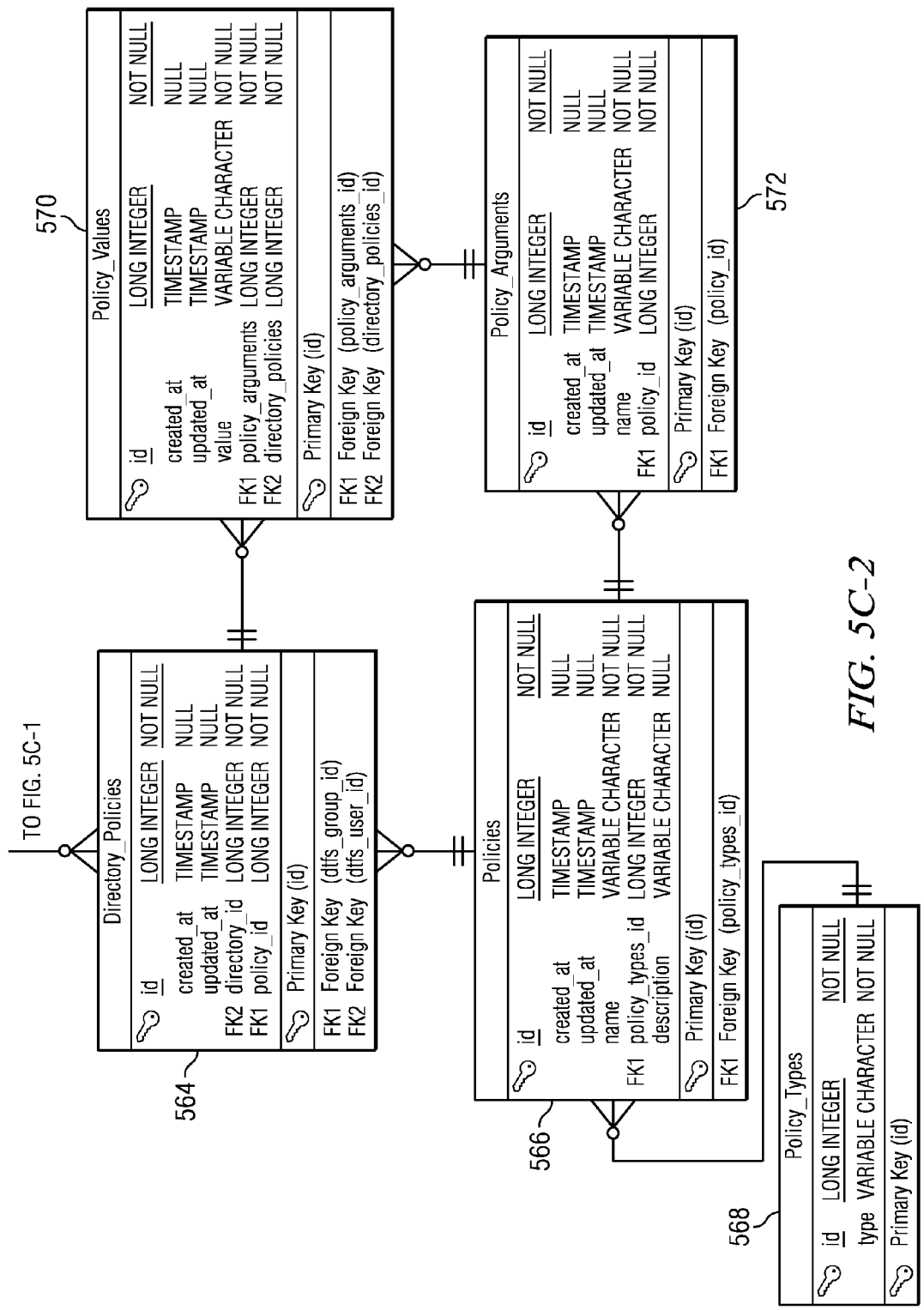

Turning to FIG. 5C one embodiment of a table schema for the storage of data relating to policies applicable to directories in an Archive Node is depicted. In this schema, there is nodes table 502, directory policies table 564, policies table 566, policy types table 568, policy values table 570 and policy arguments table 572. Entries in directory policies table 564 may be associated with polices to be applied to directories (and thus to files stored in those directories). Entries in directory policies table 564 may be linked to entries in node table 502 associated with a directory. In this manner, entries in directory policies table 564 associated with policies to be applied to directories may be linked to entries in nodes table 502 associated with a directory against which that policy is to be applied. It will be noted that a similar schema could be utilized to associate file policies with files, share policies with shares, etc.

Entries in directory policies table 564 may also be linked to an entry in policies table 566 that may be associated with a particular policy. Entries in policies table 566 may, in turn, be linked with an entry in policy types table 568 that is associated with a type of policy (for example, encryption or compression policy, number of copies to keep, replication, etc.). Thus, an entry in policies table 566 associated with a particular policy may be linked with an entry in policy type table 568 associated with the type of that policy.

Figure 5D:
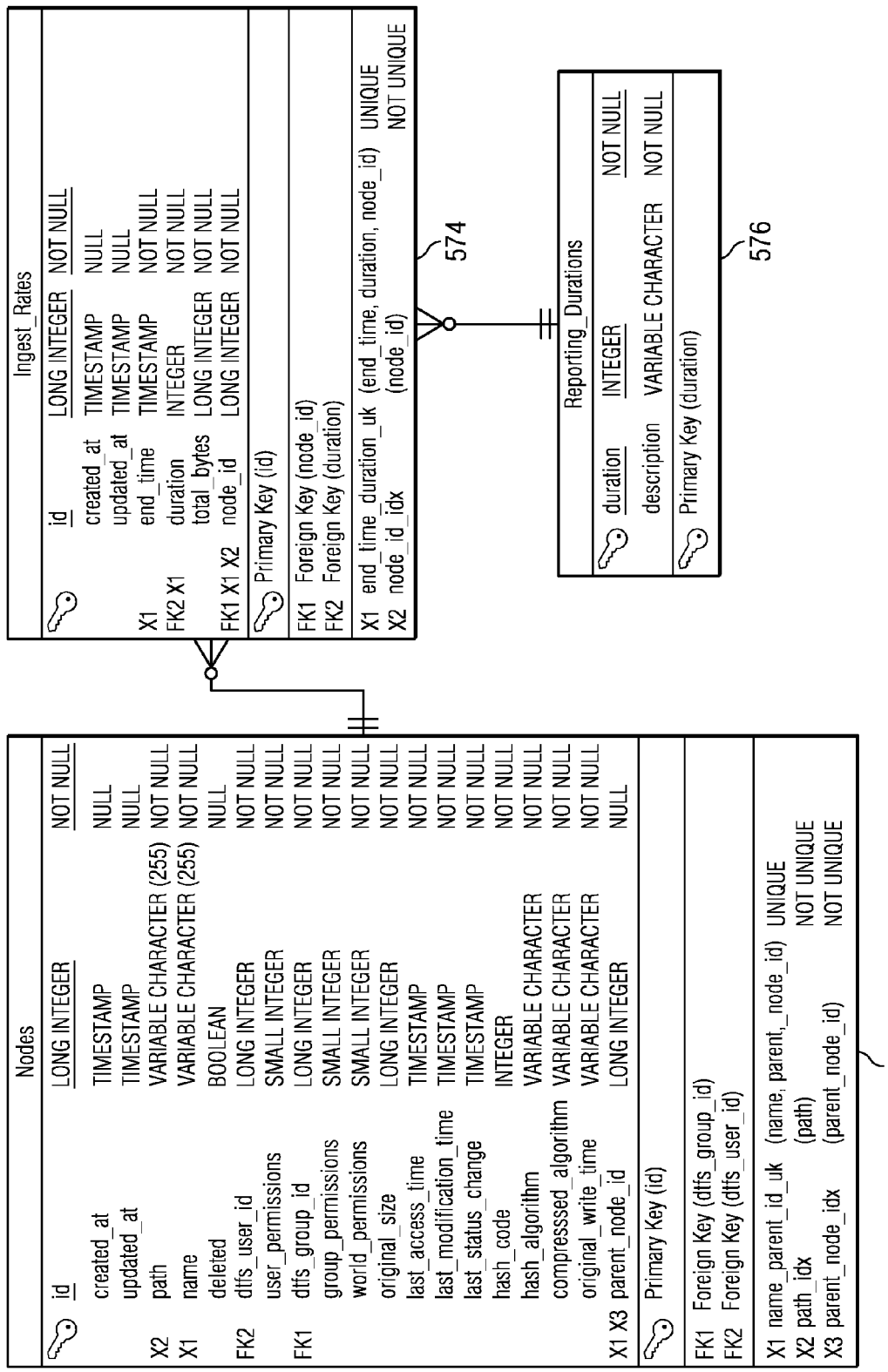

FIG. 5D depicts one embodiment of a table schema for collecting data on nodes in an Archive Node. In this schema, there is nodes table 502, ingest rates table 574 and reporting durations table 576. Thus, entries in the node table 502 can be linked to entries in ingest rates table 574 associated with statistics on the creation, reception, storage, migration, etc. of a file or directory.

From a review of the above, it will be apparent that embodiments of such Archive Nodes may provide a highly effective manner of implementing a network based file system using a tape library. In some instances, however, it may be desired to provide a high level of availability or increased performance in conjunction with network based file systems. As such, in certain embodiments Archive Node Appliances may be clustered to provide increased performance or a higher degree of fault tolerance.

Figure 6:
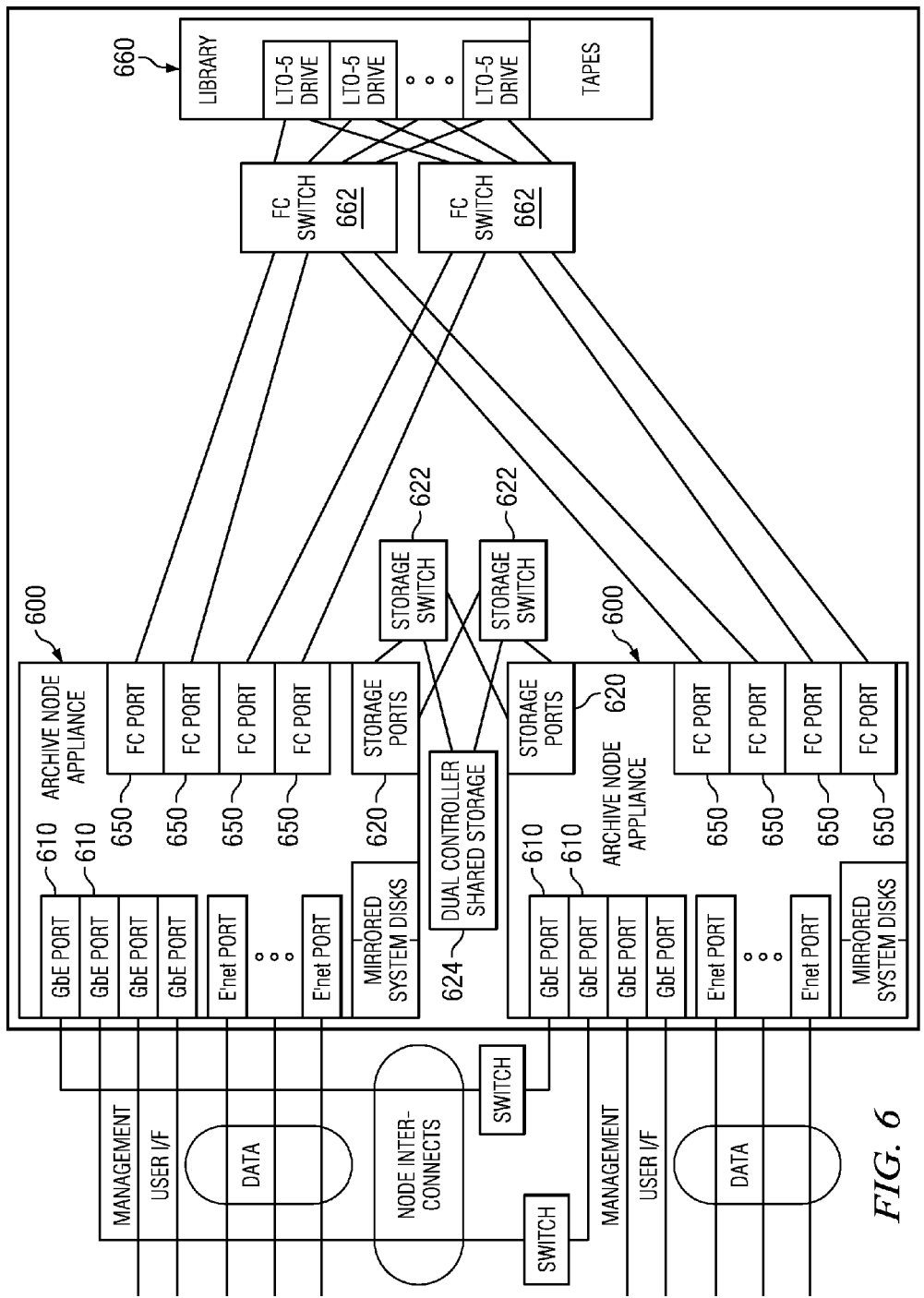
FIG. 6 is a diagrammatic representation of one embodiment of system comprising two Archive Node Appliances.

FIG. 6 depicts one embodiment of an architecture for the clustering of two Archive Node Appliances in an Archive Node. Each of Archive Node Appliances 600 may comprise similar elements as discussed above with respect to the embodiments of an Archive Node Appliance depicted in FIG. 2, 3 or 4 and thus those elements will not be elaborated on further with respect to this embodiment. In addition, Archive Node Appliance 600 may comprise Gigabit Ethernet ports 610 through which the Archive Node Appliances 600 may be coupled. Thus, Archive Node Appliances 600 may pass data between themselves during operation using Gigabit Ethernet ports 610. For example, heartbeat messages may be sent to another Archive Node 600 using the coupling between them to inform the other Archive Node 600 that the sending Archive Node 600 is still functioning.

Each Archive Node Appliance 600 may also comprise storage ports 620 through which the Archive Node Appliance may be coupled to each of storage switches 622. Each storage switch 622 is coupled to shared storage 624, such as a disk or the like, which may be accessed using dual controllers. Archive Node Appliance 600 also comprises fibre channel ports 650 through which the Archive Node Appliance 600 is coupled to a tape library 660 via a fibre channel switch 662. More specifically, half of an Archive Node Appliance's fibre channel ports 650 may be coupled to one fibre channel switch 662 while the other half of the Archive Node Appliance's fibre channel ports 650 may be coupled to another fibre channel switch 662.

Shared storage 624 may be used to store data used for operation of the Archive Node, including for example, the files as stored over the network based file system presented by the Archive Node 600, a map, an index, policies, a read cache or a file cache as discussed above. Thus, each Archive Node Appliance 600 can access any file on the shared storage 624 or tape in the library 660, and further has access to data need to implement the network based file system utilizing the tape library 660. As such, a performance increase is achieved (as, for example, there may be twice as many ports over which to receive commands from hosts, etc.) while simultaneously providing some degree of fault tolerance by providing recovery, or less downtime, from loss of a connection of an Archive Node Appliance 600, failure of an Archive Node Appliance 600, failure of the link between an Archive Node Appliance 600 and the data store, failure of a fibre channel switch, etc. It should be noted that while this embodiment of a clustered Archive Node is depicted with two Archive Node Appliances 600 and a single tape library 660, more Archive Node Appliances or media libraries may be utilized in other embodiments of a clustered Archive Node.

Figure 7:
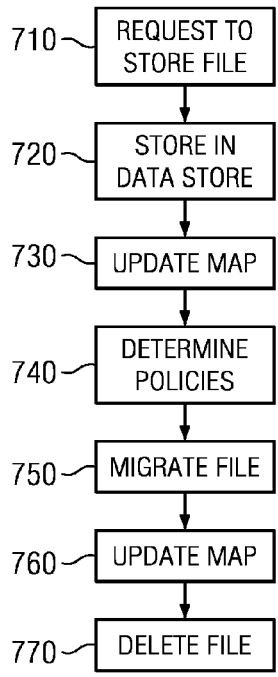
FIG. 7 is a flow chart illustrating one embodiment of a method for storing a file.

Referring now to FIG. 7, a method for storing a file using an embodiment of an Archive Node, including an Archive Node Appliance is depicted. At step 710 a request (which may comprise multiple commands in a file system protocol) to store a file may be received at the Archive Node Appliance, where the file may be associated with a name and a path as visible through the network based file system implemented by the Archive Node Appliance. For example, the path of the file may be path /patient_records and the file name may be Patient1.doc. The file is then stored on a location on the data store of the Archive Node Appliance at step 720, where the file may have a different name and be located at a path associated with the data store. For example, the path of the file as stored on the data store may be /data3 and the file name may be 550e8400-e29b-41d4-a716-446655440000.

In one embodiment, as discussed above, the file is stored in the data store according to one or more policies that apply to that file. For example, if a policy that applies to the file (for example, the policy is associated with the location associated with the network based file system where the file is stored) specifies that the file should be compressed the file may be compressed before the file is stored in the data store. Similarly, if an applicable policy specifies that the file is to be encrypted the file may be encrypted before it is stored in the data store.

The map can then be updated at step 730 to associate the name and the path of the file as visible through the network based file system with the path and name of the file as stored on the data store. Thus, in this example the path /patient_records and file name Patient1.doc, as visible through the network based file system is associated with the path /data3 and file name 550e8400-e29b-41d4-a716-446655440000 associated with the file as stored in the data store.

Subsequently, one or more policies to be applied to the file can be determined at step 740. The policies may be applied in conjunction with the migration of the file at step 750. As discussed above, in one embodiment one policy may specify that a migration timeout period is to be applied to the file before the file is migrated. This migration timeout period may specify a time period such that an amount of time equal to the migration timeout period may be allowed to elapse before the file is migrated. Thus, if such a policy exists the migration timeout period may be allowed to elapse before the file is migrated.

In instances where the file was received from another Archive Node (e.g., in an embodiment where the Archive Node is being used in a clustered architecture) as part of a replication of that file, however, even if a policy specifying a migration timeout period applies to the file the file may be migrated substantially immediately (as the migration timeout period may, for example, have been allowed to elapsed in conjunction with the migration of the file at another Archive Node Appliance in the cluster, such as the Archive Node Appliance from which the file was received).

To migrate the file, one or more tapes on which to store the file may be determined. This determination may be based on the policies that have been determined to apply to that file. For example, the number of tapes determined may be based on a policy specifying that the file is to be maintained on multiple tapes. If so, two different tapes on which to store the file may be determined. If a policy to apply to the file specifies that the file is to be encrypted a tape comprising encrypted data may be selected. Similarly, if a policy to apply to the file specifies that the file is to be compressed a tape comprising compressed data may be selected. Assume for purposes of example that the tape on which it is determined to store the file has a TapeID of AN02394.

Each of the tapes on which it is determined to store the file can then be loaded into a drive, if it is not already in a drive, and the LTFS file system mounted. Specifically, the tape may be located using the index that maintains the location of each of the tapes in the library and loaded into a drive. The file can then be copied from its location on the data store to a location on the tape. In one embodiment, a path that corresponds to the path of the file as visible through the network based file system may be created on the tape using the LTFS file system if it does not already exist. The file can then be saved using the name that corresponds to the name of the file as visible through the network based file system. Continuing with the above example, the path /patient_records may be created on the tape having TapeID AN02394 if it does not exist and the file may be saved as Patient1.doc on this tape.

In one embodiment, before or during the copying of the file to the mounted LTFS file system on the tape, actions may be taken to implement policies applicable to the file. For example, if a policy specifies that the file is to be replicated it may be sent to another Archive Node Appliance or if a policy that applies to the file specifies that the file should be compressed, the file may be compressed before the file is stored on the tape. Similarly, if an applicable policy specifies that the file is to be encrypted the file may be encrypted before it is stored on the tape.

The map can then be updated at step 760 to associate the tape on which the file is stored, the name and the path of the file as visible through the network based file system, the path and name of the file as stored in the data store and the path and name of the file as stored on the tape. Thus, in this example the path /patient_records and file name Patient1.doc, as visible through the network based file system is associated with TapeID AN02394, the path /data3 and the file name 550e8400-e29b-41d4-a716-446655440000 associated with the file as stored in the data store.

At step 770 the file, or portions thereof, may be deleted from the data store. In some embodiments, as it is desired to maintain the first portion of a file in a read cache in the data store, all portions of the file except this first portion may be deleted from the data store. It will be noted therefore, that in certain embodiments, the path and name of the file in the map that is associated with the file as stored in the data store may describe the location of the first portion of the file stored in the read cache.

Figure 8:
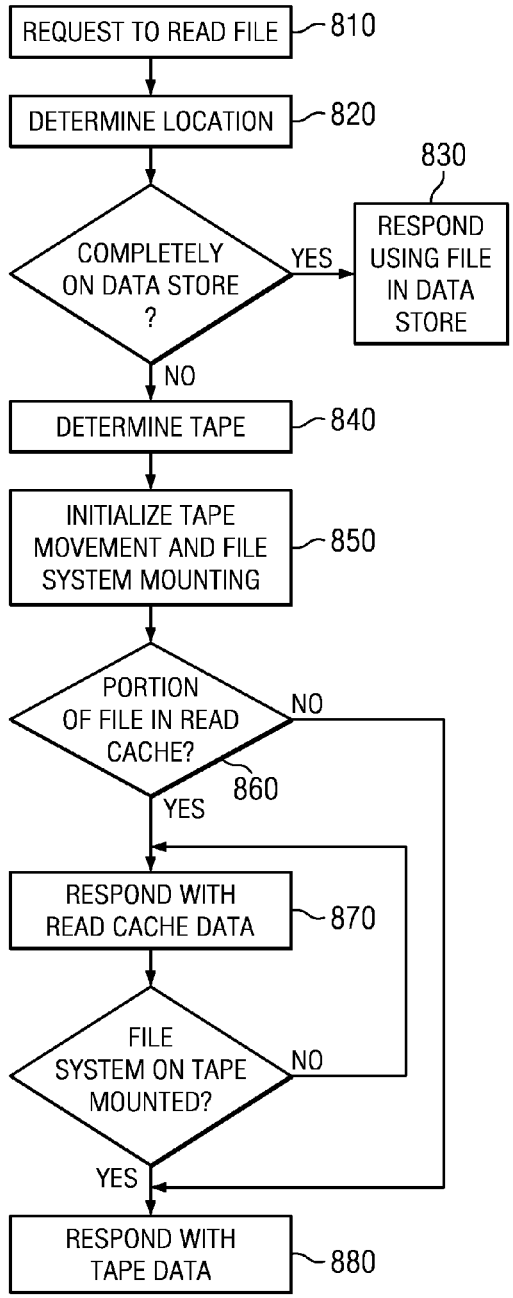
FIG. 8 is a flow chart illustrating one embodiment of a method for reading a file.

FIG. 8 depicts one embodiment of a method for reading a file using an embodiment of an Archive Node, including an Archive Node Appliance is depicted. At step 810 a request to read a file is received. This request may comprise multiple commands in a file system protocol as discussed above. The location of the file can be determined at step 820, where the file may be located in the data store of the Archive Node Appliance, on a tape in the tape library or both. If the requested file is completely on the data store at step 830 the read may be responded to using the file as stored in the data store. The file may be completely on the data store for a variety of reasons, for example, the file has been stored on the data store, but a migration timeout period associated with the file has not yet expired and thus the file has not yet been migrated; the file has been migrated but has not been deleted; the file was previously migrated and at least portions of the file deleted, but was previously read and placed in the file cache on the data store; etc.

If the file is not completely in the data store, the tape on which the file is located may be determined at step 840. The movement of the tape into a drive, if needed, and the mounting of the file system on the tape may be initiated at step 850. It can then be determined if the first portion of the file is in the read cache at step 860. If the first portion is in the read cache it may be used to respond to the read request at step 870. When the file system on the tape is mounted the file on the tape may be read and used to respond to the request at step 880. In one embodiment, when responding to the read request using the file on the tape, the file may be read into a buffer and data from the buffer used to respond to the request. In addition to reading the file into the buffer the file may also be read into file cache on the data store. If data from the file is requested at less than a threshold rate, at some point data from the file cache may be used to respond to the request for the file. Furthermore, as discussed above, the file in the file cache may be used to respond to subsequent read requests for the file.

Figure 9:
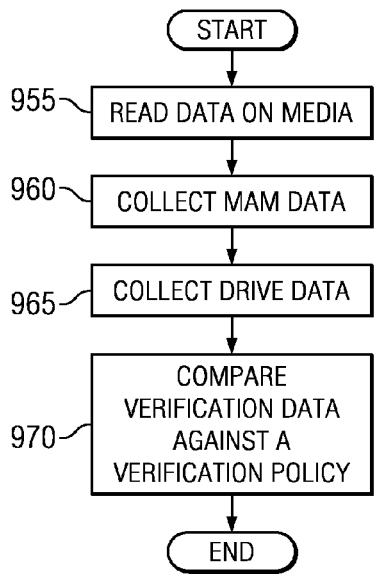
FIG. 9 is a flow chart illustrating one embodiment of a method for performing verification.

FIG. 9 is a flow chart illustrating one embodiment of a method for library verification employed by a tape verification module or a read verification module of an Archive Node Appliance to verify library media in a non-intrusive manner. It should be noted here that the particular embodiment illustrated herein is illustrated with respect to certain commands and that other, more or fewer commands may be utilized or commands in another protocol may be utilized and the embodiment employed in any particular embodiment may be at least partially dependent on the drives employed in the media library of an Archive Node.

At step 955, a library is instructed to load a tape to be verified in a drive and a Verify command or Read command is issued to the drive. The library loads the particular tape into a drive and the drive attempts to read data on the tape. If a Verify command is sent to the drive, verification data indicating whether the tape or data on the tape can be read is returned (such as, for example, a command complete or a read failure indication or equivalent). Such verification data may further include data associated with reading the tape. If a Read command is sent, and data stored on the tape is successfully read, data from the particular tape may be returned. If the tape or data on the tape is not successfully read, verification data indicating that data or the tape cannot be read is returned.

At step 960, MAM data on the particular tape may be collected by sending a Read Attribute command to the drive in which the particular tape is located. In response, the drive reads the MAM data from the MAM (which may be, in one embodiment, flash or other memory) on the particular tape and the drive returns the MAM data. At step 965, drive data from the drive which read the particular tape is collected by sending an LS command to the drive. In response, the drive returns drive data associated with the particular tape. Such data may include read errors (which may include, for example, the number of soft errors logged by the drive or hard errors) associated with a particular tape, utilization and performance data, data regarding the data read from the particular tape, detail tables or other data.

As part of steps 955, 960 or 965, data returned from the drive may be stored in a data store. Collected data may also be correlated with tapes. For example, data returned in response to a LS command may be correlated to the corresponding tape.

At step 970, verification data is compared against a verification policy. Based on the comparison of the verification data against the verification policy, it can be determined if the particular tape is unacceptably degraded and requires replacement. For example, if the verification policy specifies an upper-bound read error threshold and the number of read errors listed in returned verification data corresponding to a particular tape exceeds the read error threshold, the verification policy may require that the data on the particular tape be transferred and the tape replaced or removed from the library.

In other cases, the comparison may include a statistical analysis of the verification data and comparing the results of such analysis to the verification policies. For example, statistical analysis or other forms of mathematical analysis can be applied to verification data regarding read errors and corresponding to particular tapes. Based on the statistical analysis, which may be done in accordance with a verification policy, the degradation of a tape may be determined and the tape may be retired and data on the tape transferred.

In one embodiment, if a Read command is used to read data, the data returned as part of a successful read can be compared against the data written to the tape. For example, when data is written to a tape, redundancy check data (for example, a cyclic redundancy check, checksum or other redundancy check) can be generated using the data written to the tape and the redundancy check data stored. When data returned as part of a successful read is returned to the read verify module, redundancy check data may be generated from the received data and a redundancy check can be performed against the redundancy check data generated when data was written. In one embodiment, the redundancy check can be utilized to identify soft errors caused by, for example, corrupted data.

To achieve library verification, a specific drive of a library may be dedicated to verification such that the drive is generally only used for verification. In other embodiments, to minimize possible conflicts between verification and other operations performed by a library, drives may be dedicated to verification for periods of time (for example, a verification window). For example, a specific drive may be dedicated to archive verification for a two hour verification window on certain days. In a further embodiment, all the drives in a library are dedicated to verification during a periodic verification window. For example, all the drives in a library may be dedicated to verification during a verification window that repeats monthly.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A system for providing a network based file system, comprising:
  a media library, comprising:
    a set of drives, and
    a set of tapes formatted according to the Linear Tape File System (LTFS); and
  an archive node appliance coupled to the media library and a set of hosts, the archive node appliance comprising a processor, a data store and a set of computer instructions executable on the processor to:
    present an interface to a network based file system to the set of hosts,
    receive a request to store a file at a first location associated with the network based file system over the network based file system interface, wherein the first location was created by a user at one of the set of hosts using the interface to the network based file system,
    store the file on the data store,
    store the file at a second location on a tape of the media library, wherein the second location mirrors the first location and storing the file at the second location comprises:
      determining the tape of the set of tapes on which the file is to be stored,
      determining if the tape is in one of the set of drives and if not, loading the tape into a drive,
      mounting the LTFS file system of the tape,
      determining if the second location exists on the tape and if not, creating the second location on the tape, and
      storing the file at the second location on the tape,
    maintain a map between the first location and the second location,
    receive a request to read the file at the first location associated with the network based file system,
    determine the tape on which the file is stored,
    access the file on the tape at the second location, and
    respond to the request to read the file over the network based file system interface using the file on the tape, wherein responding to the request to read the file comprises:
      determining the tape on which the file is stored using the map and the first location,
      determining if the tape is in one of the set of drives of the tape library and if not, loading the tape into the drive,
      mounting the LTFS file system on the tape, and
      accessing the file on the tape at the second location using LTFS.

2. The system of claim 1, wherein storing the file at the second location on the tape comprises:
  storing the file in the data store at a third location, and
  migrating the file to the second location after a migration timeout period has elapsed.

3. The system of claim 1, wherein the set of computer instructions are executable to maintain a read cache in the data store and responding to the request over the network based file system interface comprises:
  accessing a first portion of the file in the read cache; and
  responding to the request over the network based file system interface using the first portion of the file.

4. The system of claim 1, wherein the network based file system interface is a Filesystem in Userspace (FUSE) file system.

5. The system of claim 1, wherein the second location mirroring the first location comprises the first location having the same path as the second location.

6. The system of claim 1, wherein storing the file at the second location comprises applying a policy to the file.

7. The system of claim 1, wherein storing the file on the data store comprises storing the file in a read cache.

8. A non-transitory computer readable medium comprising a set of instructions, the instructions for:
  presenting an interface to a network based file system to a set of hosts;
  receiving a request to store a file at a first location associated with the network based file system over the network based file system interface, wherein the first location was created by a user at one of the set of hosts using the interface to the network based file system;
  storing the file on a data store;
  storing the file at a second location on a tape of a media library comprising a set of drives and a set of tapes formatted according to the Linear Tape File System (LTFS), wherein the second location mirrors the first location and storing the file at the second location comprises:
    determining the tape of the set of tapes on which the file is to be stored,
    determining if the tape is in one of the set of drives and if not, loading the tape into a drive,
    mounting the LTFS file system of the tape,
    determining if the second location exists on the tape and if not, creating the second location on the tape, and
    storing the file at the second location on the tape;
  maintaining a map between the first location and the second location;
  receiving a request to read the file at the first location associated with the network based file system;
  determining the tape on which the file is stored;
  accessing the file on the tape at the second location; and
  responding to the request to read the file over the network based file system interface using the file on the tape, wherein responding to the request to read the file comprises:
    determining the tape on which the file is stored using the map and the first location, determining if the tape is in one of the set of drives of the tape library and if not, loading the tape into the drive, mounting the LTFS file system on the tape, and accessing the file on the tape at the second location using LTFS.

9. The computer readable medium of claim 8, wherein storing the file at the second location on the tape comprises:
   storing the file in the data store at a third location, and
   migrating the file to the second location after a migration timeout period has elapsed.

10. The computer readable medium of claim 8, wherein the set of computer instructions are further executable to maintain a read cache in the data store and responding to the request over the network based file system interface comprises:
   accessing a first portion of the file in the read cache; and
   responding to the request over the network based file system interface using the first portion of the file.

11. The computer readable medium of claim 8, wherein the network based file system interface is a Filesystem in Userspace (FUSE) file system.

12. The computer readable medium of claim 8, wherein the second location mirroring the first location comprises the first location having the same path as the second location.

13. The computer readable medium of claim 8, wherein storing the file at the second location comprises applying a policy to the file.

14. The computer readable medium of claim 8, wherein storing the file on the data store comprises storing the file in a read cache.

15. A method for implementing a network based file system, comprising:
   presenting an interface to a network based file system to a set of hosts;
   receiving a request to store a file at a first location associated with the network based file system over the network based file system interface, wherein the first location was created by a user at one of the set of hosts using the interface to the network based file system;
   storing the file on a data store;
   storing the file at a second location on a tape of a media library comprising a set of drives and a set of tapes formatted according to the Linear Tape File System (LTFS), wherein the second location mirrors the first location and storing the file at the second location comprises:
      determining the tape of the set of tapes on which the file is to be stored,
      determining if the tape is in one of the set of drives and if not, loading the tape into a drive,
      mounting the LTFS file system of the tape,
      determining if the second location exists on the tape and if not, creating the second location on the tape, and
      storing the file at the second location on the tape;
   maintaining a map between the first location and the second location;
   receiving a request to read the file at the first location associated with the network based file system;
   determining the tape on which the file is stored;
   accessing the file on the tape at the second location; and
   responding to the request to read the file over the network based file system interface using the file on the tape, wherein responding to the request to read the file comprises:
      determining the tape on which the file is stored using the map and the first location,
      determining if the tape is in one of the set of drives of the tape library and if not, loading the tape into the drive,
      mounting the LTFS file system on the tape, and
      accessing the file on the tape at the second location using LTFS.

16. The method of claim 15, wherein storing the file at the second location on the tape comprises:
   storing the file in the data store at a third location, and
   migrating the file to the second location after a migration timeout period has elapsed.

17. The method of claim 15, further comprising maintaining a read cache in the data store and wherein responding to the request over the network based file system interface comprises:
   accessing a first portion of the file in the read cache; and
   responding to the request over the network based file system interface using the first portion of the file.

18. The method of claim 15, wherein the network based file system interface is a Filesystem in Userspace (FUSE) file system.

19. The method of claim 15, wherein the second location mirroring the first location comprises the first location having the same path as the second location.

20. The method of claim 15, wherein storing the file at the second location comprises applying a policy to the file.

21. The method of claim 15, wherein storing the file on the data store comprises storing the file in a read cache.

* * * * *